US012810160B2

(12) United States Patent
Sakai

(10) Patent No.: US 12,810,160 B2
(45) Date of Patent: Nov. 24, 2026

(54) METHOD FOR REDUCING ELEMENT OF NEURAL NETWORK HAVING ATTENTION MECHANISM

(71) Applicant: Fujitsu Limited, Kawasaki (JP)

(72) Inventor: Yasufumi Sakai, Fuchu (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 18/353,912

(22) Filed: Jul. 18, 2023

(65) Prior Publication Data

US 2024/0185072 A1 Jun. 6, 2024

(30) Foreign Application Priority Data

Oct. 20, 2022 (JP) ................................ 2022-168172

(51) Int. Cl.
*G06N 3/082* (2023.01)

(52) U.S. Cl.
CPC .................................. *G06N 3/082* (2013.01)

(58) Field of Classification Search
CPC .......... G06N 3/082; G06N 3/04; G06N 3/045; G06N 3/08; G06N 3/084
See application file for complete search history.

(56) References Cited

U.S. PATENT DOCUMENTS

2019/0378014 A1 12/2019 Yamamoto et al.
2022/0036194 A1 2/2022 Sundaresan et al.
2022/0374766 A1* 11/2022 Thorsley .............. G06N 3/0495
2024/0127049 A1* 4/2024 Choudhury .......... G06N 3/0495
2024/0184254 A1* 6/2024 Werkman ................. G06N 3/08
2024/0244274 A1* 7/2024 Koyuncu ............... G06N 3/088
2025/0068914 A1* 2/2025 Alnahari ............... G06N 3/063

FOREIGN PATENT DOCUMENTS

JP 2019-212206 12/2019
JP 2021-068233 4/2021

* cited by examiner

*Primary Examiner* — Tan H Tran
(74) *Attorney, Agent, or Firm* — Fujitsu Intellectual Property Center

(57) ABSTRACT

A method including: inserting padding layers into a downstream side of each of a Q layer and a K layer, the padding layer padding one or more elements of a tensor, the Q and K layers respectively outputting a Query and a Key, the Query and the Key being a result of an arithmetic operating process on an input tensor in an attention mechanism in the trained machine learning model of a neural network having the attention mechanism, and padding a tensor QT and a tensor KT with the padding layers associated one with each of a reduced Q layer and a reduced K layer such that the tensor QT and the tensor KT have a same number of elements, the tensor QT and the tensor KT being respectively included in the reduced Q layer and the reduced K layer in which one or more elements are reduced.

20 Claims, 31 Drawing Sheets

FIG.21

| | Accuracy before pruning | Accuracy after pruning | Model size compression rate |
|---|---|---|---|
| Not inserting Zero padding layer (Not performing linear pruning of MHA) | 91.1 % | 90.2 % | 39.1% |
| Inserting Zero padding layer (Performing linear pruning of MHA) | 91.1% | 90.2 % | **50.2%** |

METHOD FOR REDUCING ELEMENT OF NEURAL NETWORK HAVING ATTENTION MECHANISM

CROSS-REFERENCE TO RELATED APPLICATION

This application is based upon and claims the benefit of priority of the prior Japanese Patent application No. 2022-168172, filed on Oct. 20, 2022, the entire contents of which are incorporated herein by reference.

FIELD

The embodiments discussed herein are related to a computer-readable recording medium having stored therein a machine learning program, a method for machine learning, and an information processing apparatus.

BACKGROUND

NNs (Neural Networks), which are used for AI (Artificial Intelligence) tasks such as image processing, tend to achieve high performance (e.g., high inference accuracy) with complex configurations. On the other hand, the complex configurations of NNs may increase the number of times of calculation in executing the NNs by calculators and the size of memory used in executing the NNs by the calculators.

As a method for reducing the number of times of calculation, in other words, shortening calculation durations (speeding up), and for reducing the size of memory, in other words, downsizing machine learning models of NNs, "pruning" has been known.

The pruning is a method for reducing the data size of the machine learning models and for reducing the calculation durations and communication durations by reducing (pruning) at least one type of elements among edges (weights), nodes, and channels of NNs.

Excessive pruning causes degradation of inference accuracy of NNs. Therefore, it is important to perform pruning of NNs while maintaining the inference accuracy or while keeping the degraded level of inference accuracy at a predetermined level.

For example, in pruning, a known method selects a layer that does not significantly affect the inference accuracy of NNs. This method, for example, determines a channel of a convolutional layer to be pruned based on parameters used in a Batch Normalization (BN) layer that follows a convolutional layer.

In addition, one of known NNs has an attention mechanism such as a Multi-Head Attention (MHA) structure. An attention mechanism includes three fully-connected layers at an input part. The three fully-connected layers are layers that each output one of tensors of a Q (Query), a K (Key), and a V (Value).

For example, a related art is disclosed in US Patent Application Publication No. 2022/0036194.

SUMMARY

According to an aspect of the embodiments, a non-transitory computer-readable recording medium has stored therein a machine learning program for causing a computer to execute a process including: inserting padding layers into a downstream side of each of a Q layer and a K layer, the padding layer padding one or more elements of a tensor, the Q layer outputting a Query, the K layer outputting a Key, the Query and the Key being a result of an arithmetic operating process on an input tensor in an attention mechanism in the trained machine learning model of a neural network having the attention mechanism, and padding a tensor QT included in a reduced Q layer in which one or more elements are reduced based on a first reduction ratio and a tensor KT included in a reduced K layer in which one or more elements are reduced based on a second reduction ratio with the padding layers associated one with each of the reduced Q layer and the reduced K layer such that the tensor QT has a number of elements same as a number of elements that the tensor KT has.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 is a diagram illustrating an example of accuracy before and after pruning and a compression rate of a data size in cases where a zero-padding process is applied and not applied;

DESCRIPTION OF EMBODIMENT(S)

Figure 1:
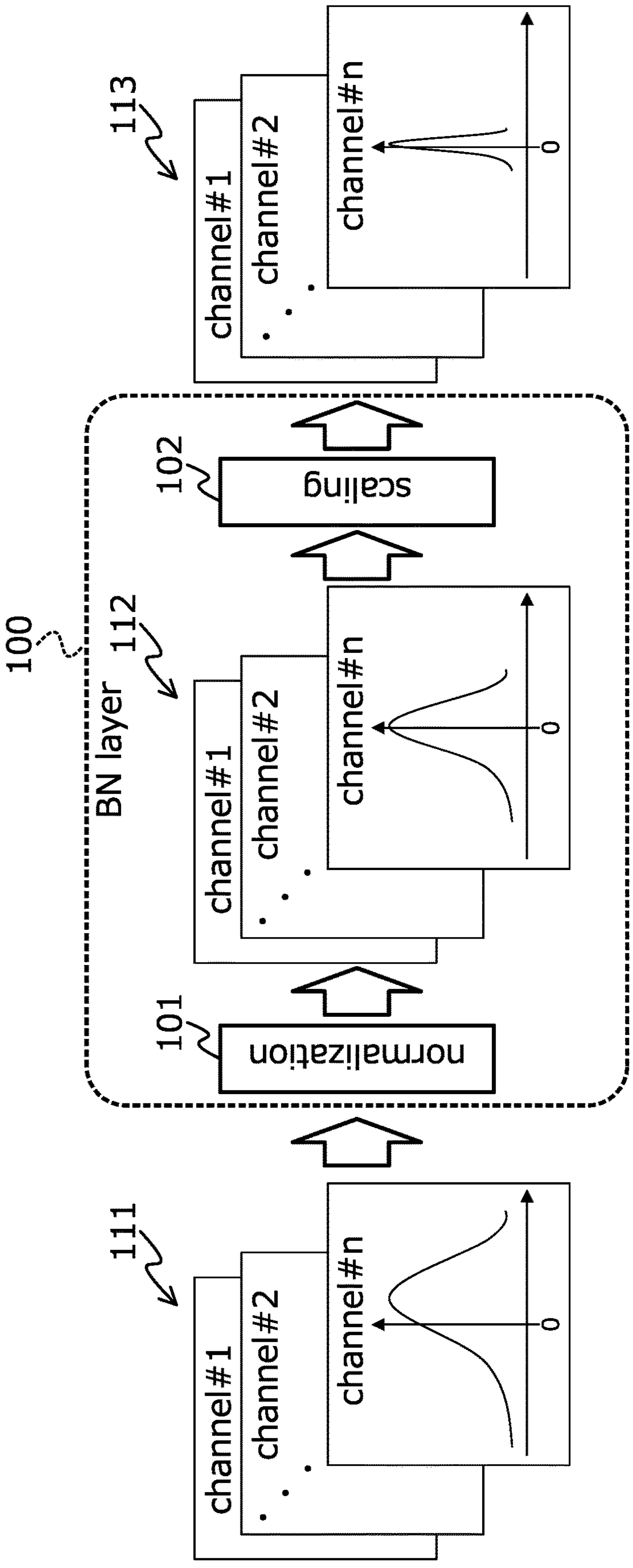
FIG. 1 is a diagram for explaining an example of a process that determines a channel of a convolutional layer to be pruned.

The method for selecting the layer that does not significantly affect the inference accuracy of NNs is applied to the convolutional layer to which the BN layer is connected, but is not assumed to be applied to other layers such as the convolutional layers to which no BN layer is connected or fully connected layers.

For example, in cases where a method of selecting a layer that does not significantly affect the inference accuracy of a NN can be applied to the multiple layers described above, the NN is assumed to include an attention mechanism. When pruning is performed by this method, the three fully-connected layers at the input part of the attention mechanism are not pruned and consequently the pruning rate of the entire machine learning model is lowered, so that the effect of compression (downsizing) of the data size of the machine learning model by pruning is lowered.

Hereinafter, an embodiment of the present disclosure will now be described with reference to the drawings. However, the embodiment described below is merely illustrative and there is no intention to exclude the application of various modifications and techniques that are not explicitly described in the embodiment. For example, the present embodiment can be variously modified and implemented without departing from the scope thereof. In the drawings used in the following description, the same reference numerals denote the same or similar parts unless otherwise specified.

<1> One Embodiment

Figure 2:
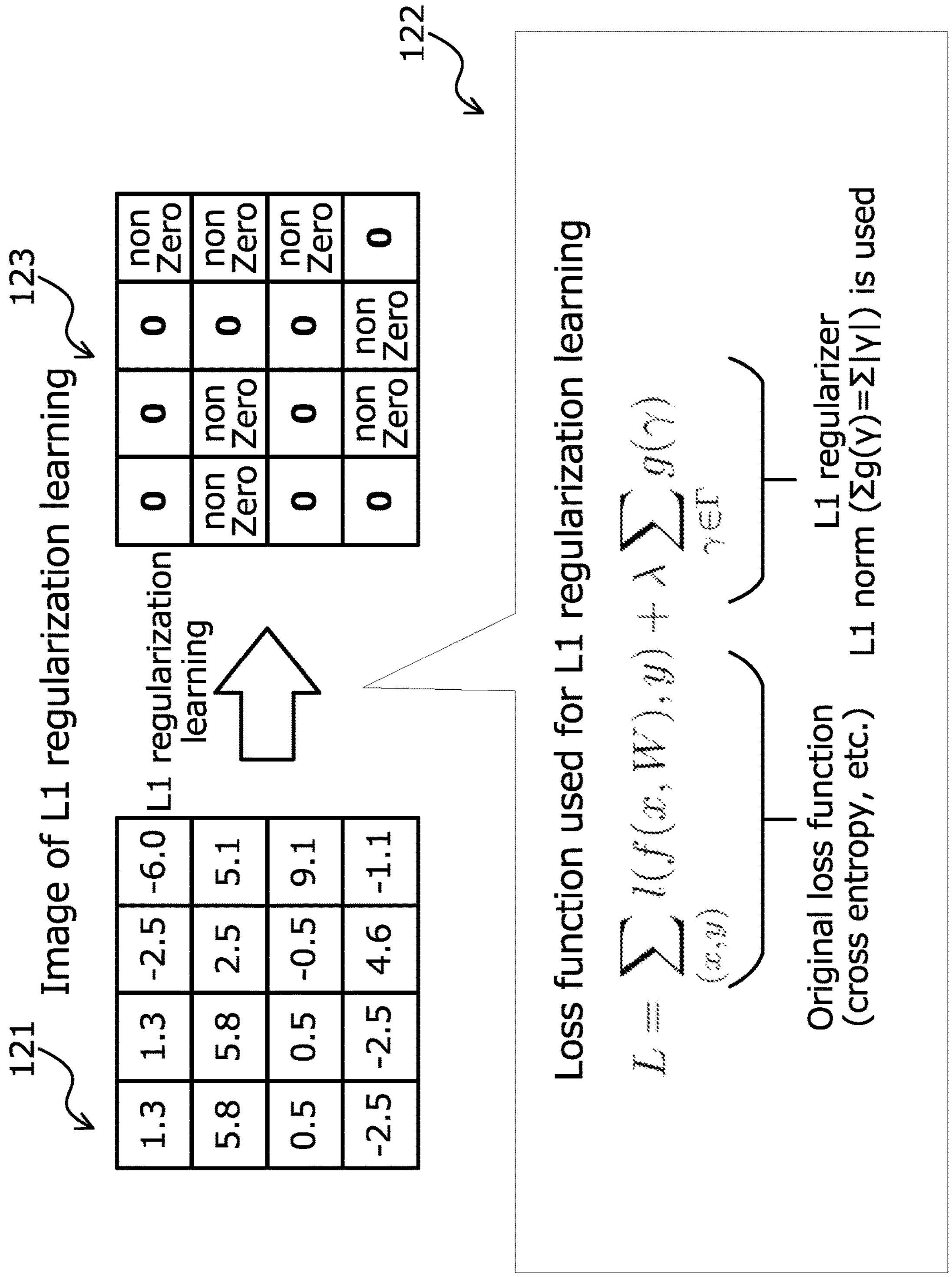
FIG. 2 is a diagram illustrating an example of L1 regularization learning.

FIG. 1 is a diagram for explaining an example of a process that determines a channel of a convolutional layer to be pruned, and FIG. 2 is a diagram illustrating an example of L1 regularization learning. As a method for selecting a layer that does not significantly affect inference accuracy of a NN, FIG. 1 illustrates a method in which a calculator uses a scaling factor $\gamma$ used in a BN layer 100 that follows a convolutional layer to determine a channel of a convolutional layer to be pruned. The graphs illustrated in channels 111 to 113 in FIG. 1 represent distribution of output tensors.

As depicted in FIG. 1, the calculator executes a normalization 101 for each of multiple channels 111 (#1 to #n; n is an integer of 2 or more) inputted from a convolutional layer to the BN layer 100. For example, in the normalization 101, in accordance with the following equation (1), the calculator calculates a mean value $\mu$ and a variance $\sigma^2$ for each channel 111 to obtain multiple channels 112 (#1 to #n) that represent normalized distribution of mean "0" and variance "1". In the following equation (1), $z_{in}$ and $z_{mid}$ represent channels 111 and 112, respectively, and $\mu_B$ and $\sigma_B^2$ represent the mean value and the variance in the current mini-batch B, respectively.

[Equation 1]

$$z_{mid} = \frac{z_{in} - \mu_B}{\sqrt{\sigma_B^2 + \epsilon}} \quad (1)$$

The calculator executes scaling 102 for the multiple channels 112 (#1 to #n). For example, in the scaling 102, in accordance with the following equation (2), the calculator multiplies each of the multiple channels 112 by the scaling factor $\gamma$, and adds a bias B to the multiplication result to output multiple channels 113 (#1 to #n) that represent distribution scaled by the parameters $\gamma$ and $\beta$. In the following equation (2), $z_{out}$ represents the channels 113. The parameters $\gamma$ and $\beta$ may be optimized by machine learning.

[Equation 2]

$$z_{out}=\gamma z_{mid}+\beta \quad (2)$$

At this step, the output is almost eliminated for the channel 113 (channel #n in the example of FIG. 1) resulted from the scaling 102 when $\gamma$ is small. This means that inference accuracy of the NN is not significantly affected even if the channel is deleted by pruning. Thus, the calculator determines the channel as a pruning target in units of channels by searching for a small (e.g., "0") $\gamma$.

For example, the calculator searches for a small (diminishing) $\gamma$ by applying L1 regularization learning to $\gamma$. The L1 regularization learning is a machine learning technique known to be capable of making a parameter to be learned "sparse" by performing machine learning while adding a regularizer of L1 to a loss function calculated by the NN at the output.

As illustrated in FIG. 2, the calculator performs the L1 regularization learning using a loss function 122 on a vector 121 to obtain a vector 123 on which the L1 regularization has been performed. The loss function 122 may be, as expressed by the following equation (3), a function L obtained by adding an original loss function (first term) such as cross entropy and an L1 regularizer (second term) that uses an L1 norm ($\Sigma g(\gamma)=\Sigma|\gamma|$).

[Equation 3]

$$L=\Sigma_{(x,y)}l(f(x,W),Y)+\lambda\Sigma_{\gamma\in\Gamma}g(\gamma) \quad (3)$$

The L1 regularization learning causes each parameter of the vector 123 to indicate (dichotomize) whether each parameter of the vector 121 becomes zero or non-zero. By using such L1 regularization learning, the calculator can identify a channel(s) in which $\gamma$ becomes zero (close to zero) as the channel of the pruning target.

The identification of the pruning target using the L1 regularization learning depicted in FIGS. 1 and 2 is applied to the convolutional layer to which the BN layer is connected, but is not assumed to be applied to other layers such as the convolutional layers to which no BN layer is connected and the fully connected layers.

Figure 3:
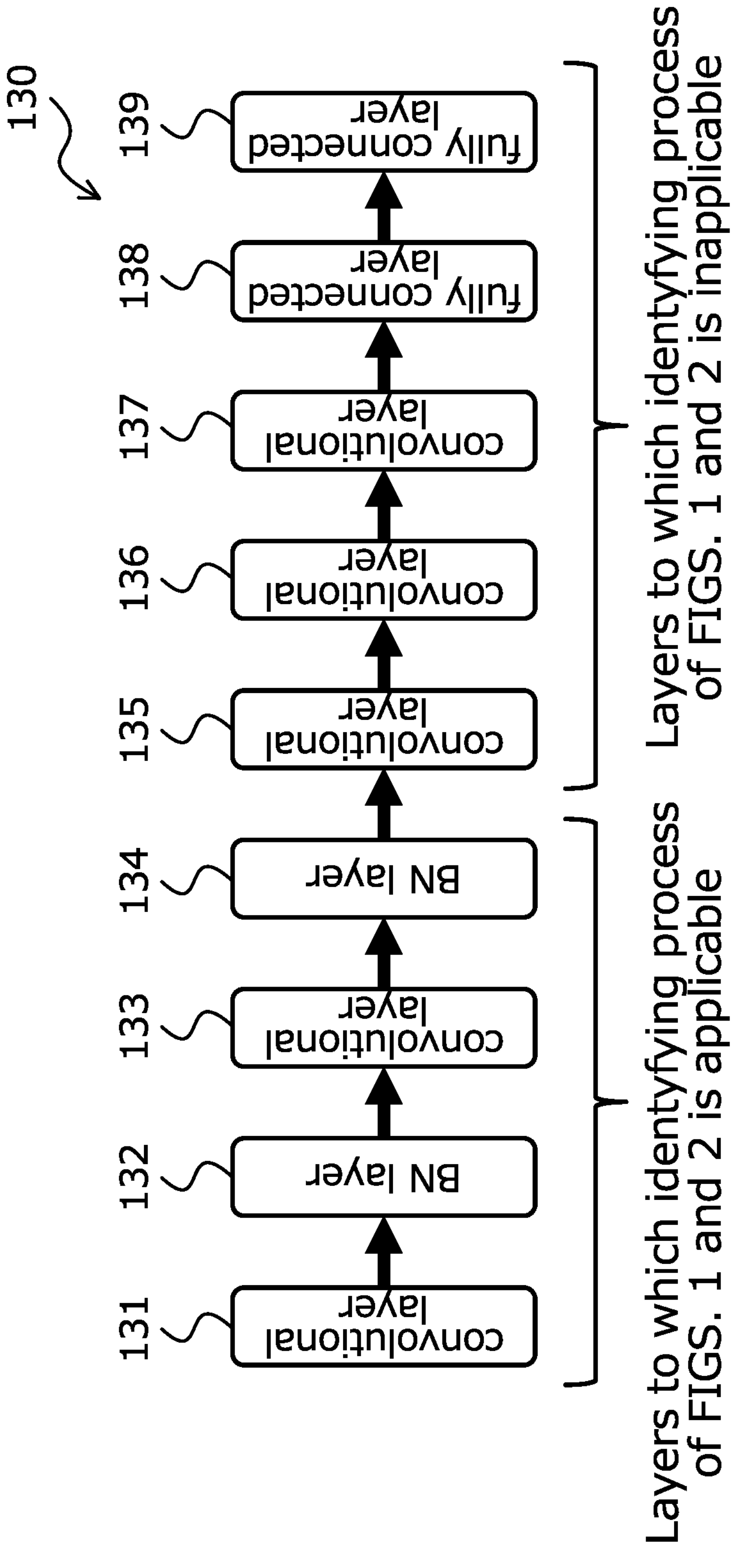
FIG. 3 is a diagram illustrating an example of whether the method of FIGS. 1 and 2 is applicable or inapplicable in layers of a NN.

FIG. 3 is a diagram illustrating an example of whether the method of FIGS. 1 and 2 is applicable or inapplicable in layers 131 to 139 of a NN 130. As depicted in FIG. 3, convolutional layers 131 and 133 and BN layers 132 and 134 are layers to which the L1 regularization learning depicted in FIGS. 1 and 2 is applicable, and convolutional layers 135 to 137 and fully connected layers 138 and 139 are layers to which the L1 regularization learning depicted in FIGS. 1 and 2 is inapplicable.

In view of the above, one embodiment describes a method for realizing downsizing of a NN by determining a pruning rate for each layer regardless of the type of layers.

Figure 4:
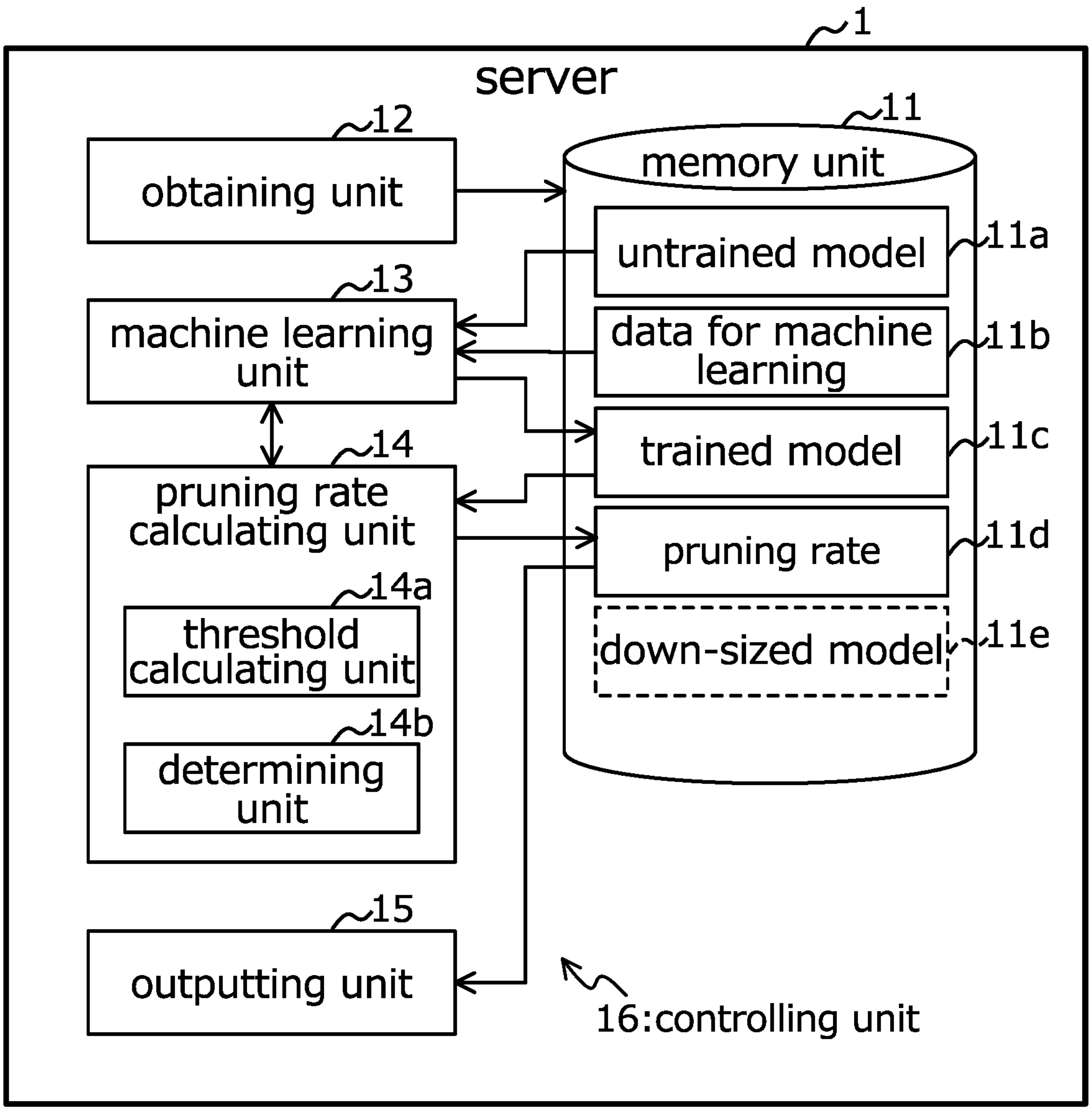
FIG. 4 is a block diagram illustrating an example of a functional configuration of a server according to one embodiment.

<1-1> Example of Functional Configuration of Server According to One Embodiment FIG. 4 is a block diagram illustrating an example of a functional configuration of a server 1 according to the one embodiment. The server 1 is an example of a calculator, a computer, or an information processing apparatus that outputs the pruning rate. As illustrated in FIG. 4, the server 1 may illustratively include a memory unit 11, an obtaining unit 12, a machine learning unit 13, a pruning rate calculation unit (hereinafter, simply referred to as a "calculation unit") 14, and an outputting unit 15. The obtaining unit 12, the machine learning unit 13, the calculating unit 14, and the outputting unit 15 are examples of a controlling unit 16.

The memory unit 11 is an example of a storage area, and stores various data to be used by the server 1. As illustrated in FIG. 4, the memory unit 11 may be illustratively capable of storing an untrained model 11*a*, data 11*b* for machine learning, a trained model 11*c*, pruning rates 11*d*, and a down-sized model 11*e*.

The obtaining unit 12 obtains the untrained model 11*a* and the data 11*b* for machine learning, and stores them in the memory unit 11. For example, the obtaining unit 12 may generate one of or both the untrained model 11*a* and the data 11*b* for machine learning in the server 1, or may receive them from a computer outside the server 1 via a non-illustrated network.

The untrained model 11*a* may be a model of the NN including the untrained parameters before machine learning. The NN may include various layers and may be, for example, a DNN (Deep NN). The NN may include, for example, a convolutional layer to which no BN layer is connected or a fully connected layer, or may include a convolutional layer to which a BN layer is connected, and may be, as an example, the NN 130 illustrated in FIG. 3.

The data 11*b* for machine learning may be, for example, a data set for training to be used for machine learning (training) of the untrained model 11*a*. For example, when machine learning is performed on a NN for realizing image processing, the data 11*b* for machine learning may include, for example, multiple pairs of labeled training data that includes training data such as image data and a ground truth label for the training data.

In the machine learning phase, the machine learning unit 13 executes a machine learning process that performs machine learning on the untrained model 11*a* based on the data 11*b* for machine learning. For example, the machine learning unit 13 may generate the trained model 11*c* by the machine learning process of the untrained model 11*a*. The trained model 11*c* may be a NN model including a trained parameter(s).

The trained model 11*c* may be obtained by updating a parameter included in the untrained model 11*a*, and may be regarded as, for example, a model as a result of a change from the untrained model 11*a* to the trained model 11*c* through the machine learning process. The machine learning process may be implemented by various known techniques.

The calculating unit 14 calculates the pruning rates 11*d* by executing a pruning rate calculation process for the trained model 11*c*, and stores them into the memory unit 11.

For example, the calculating unit 14 may include a threshold calculating unit 14*a* that calculates a threshold for selecting one of pruning rate candidates for each layer, and a determining unit 14*b* that determines, based on inference accuracy of the model pruned by the pruning rate candidates, the pruning rates 11*d* to be adopted.

The outputting unit 15 outputs output data based on the pruning rates 11*d* generated (obtained) by the calculating unit 14. The output data may include, for example, the pruning rates 11*d* themselves, the down-sized model 11*e*, or both.

The down-sized model 11*e* is data of a down-sized model of the trained model 11*c*, which is obtained by execution of pruning on the trained model 11*c* based on the pruning rates 11*d*. For example, in cooperation with the machine learning unit 13, the outputting unit 15 may acquire the down-sized model 11*e* by execution of pruning and re-learning on the trained model 11*c* while applying the pruning rates 11*d*, and may store the acquired model into the memory unit 11. The down-sized model 11*e* may be, for example, generated separately from the trained model 11*c*, or may be the updated data of the trained model 11*c* obtained through pruning and re-learning.

In outputting the output data, the outputting unit 15 may, for example, transmit (provide) the output data to another non-illustrated computer, or may store the output data into the memory unit 11 and manage the output data to be acquirable from the server 1 or another computer. Alternatively, in outputting the output data, the outputting unit 15 may display information indicating the output data on an output device such as the server 1, or may output the output data in various other manners.

<1-2> Example of Pruning Rate Calculation Process

Next, an example of the pruning rate calculation process by the calculating unit 14 of the server 1 will be described. In the following description, a calculation target of the pruning rate is assumed to be a weight matrix W which is an example of a parameter of a layer.

The calculating unit 14 determines the pruning rate regardless of the type of layers by using errors in tensors for each layer, which errors are generated by pruning. As an example, the calculating unit 14 may calculate the pruning rate according to the following procedures (i) to (iii).

(i) The calculating unit 14 (threshold calculating unit 14*a*) determines (calculates), for each layer, the pruning rate that can guarantee the accuracy.

The term "guarantee the accuracy" means, for example, to guarantee that accuracy of inference (inference accuracy) using the down-sized model 11*e* obtained by pruning the trained model 11*c* exceeds a predetermined criterion.

Figure 5:
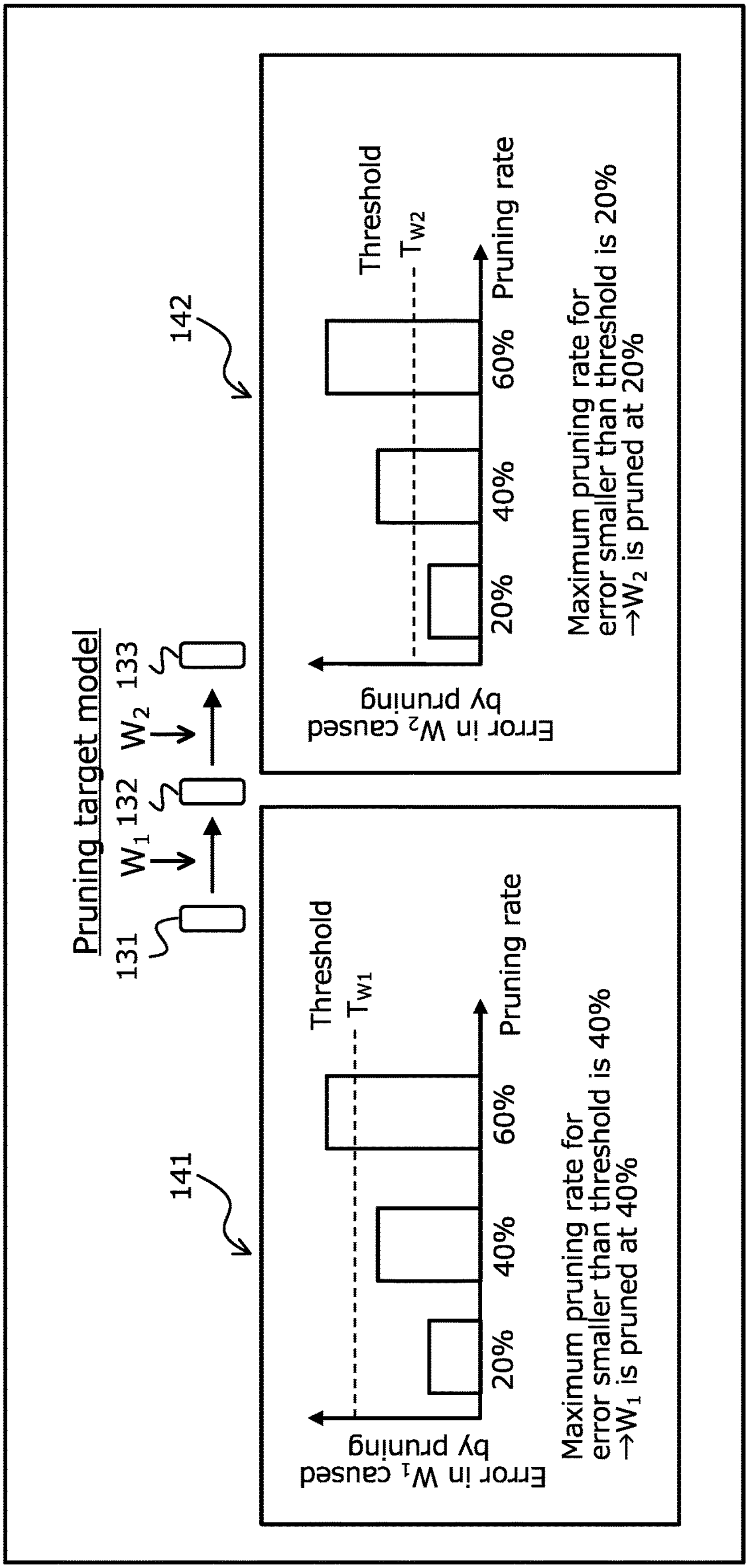
FIG. 5 is a diagram illustrating an example of calculating a pruning rate that can guarantee accuracy.

FIG. 5 is a diagram illustrating an example of calculating the pruning rate that can guarantee the accuracy. As illustrated in FIG. 5, in (i), the threshold calculating unit 14*a* determines, for each weight matrix W of the multiple layers, the pruning rate to be applied to the weight matrix W of each layer included in the trained model 11*c* of the pruning target. Although FIG. 5 focuses on the layers 131 to 133, the application of the description of FIG. 5 is not limited to these, and may be any of the layers 131 to 139 illustrated in FIG. 3.

Here, the pruning rate is an example of a ratio for reducing (reduction ratio) an element(s) of a layer and indicates a ratio for rendering the pruning target in the trained model 11*c* "sparse". In the example of FIG. 2, the pruning rate corresponds to the number of places set as "0" in the vector 123.

As illustrated in FIG. 5, the threshold calculating unit 14*a* selects, for each of the weight matrix $W_1$ of the layer 131 (weight matrix $W_1$ connected to the layer 132) and the weight matrix $W_2$ of the layer 132 (weight matrix $W_2$ connected to the layer 133), one pruning rate from multiple pruning rate candidates. The pruning rate candidates are examples of reduction ratio candidates, and may be, for example, two or more ratios between 0% and 100%, common to multiple layers, different in individual layers, or a combination thereof. In the example of FIG. 5, the pruning rate candidates are assumed to be 0%, 20%, 40%, and 60%.

For example, the threshold calculating unit 14*a* obtains an error in tensors between before and after pruning in cases where the pruning is performed for each pruning rate candidate, and determines the maximum pruning rate candidate among the pruning rate candidates with errors smaller than a threshold $T_W$. In the example of FIG. 5, for $W_1$, the threshold calculating unit 14*a* determines that the maximum pruning rate candidate with an error smaller than a threshold $T_{w1}$ is 40% (see arrow 141). In addition, for $W_2$, the threshold calculating unit 14*a* determines that the maximum pruning rate candidate with an error smaller than a threshold $T_{w2}$ is 20% (see arrow 142).

The threshold $T_w$ is a threshold of the error in the tensors between before and after the pruning, and is an upper limit of the pruning rate that can guarantee the accuracy. For example, the threshold calculating unit 14*a* may calculate the threshold $T_w$ for each layer by expressing the loss function at the time of pruning the pruning target by an approximate expression such as a first-order Taylor expansion. The details of the method for calculating the threshold $T_w$ will be described later.

The pruning rate calculated in (i) may be regarded as a "provisionally calculated" pruning rate in relation to processes of (ii) and (iii).

As described above, the threshold calculating unit 14*a* calculates the thresholds T of the errors in the tensors between before and after the reduction one for each element of the multiple layers in the trained model 11*c* of the NN including the multiple layers. The threshold calculating unit 14*a* selects the reduction ratio candidates to be applied one to each of the multiple layers based on the multiple thresholds T and the errors in the tensors between before and after the reduction in the cases where the elements are reduced by each of the multiple reduction ratio candidates in each of the multiple layers.

(ii) The calculating unit 14 (determining unit 14*b*) determines the pruning rate based on the accuracy of the machine learning model pruned (downsized) by using the pruning rate determined in (i) and the accuracy of the machine learning model that has not undergone pruning.

For example, the determining unit 14*b* considers the error caused by the approximate expression (first-order Taylor expansion), and compares the sum of accuracy $Acc_p$ of the model pruned by the pruning rate determined in (i) for each layer and an accuracy margin $Acc_m$ with accuracy $Acc_{wo}$ of an unpruned model. The accuracy margin $Acc_m$ is a margin for which the inference accuracy is allowed to be degraded, and may be set by a designer. The margin may be "0", and in this case, the determining unit 14*b* may compare the accuracy $Acc_p$ with the accuracy $Acc_{wo}$ of the unpruned model.

Figure 6:
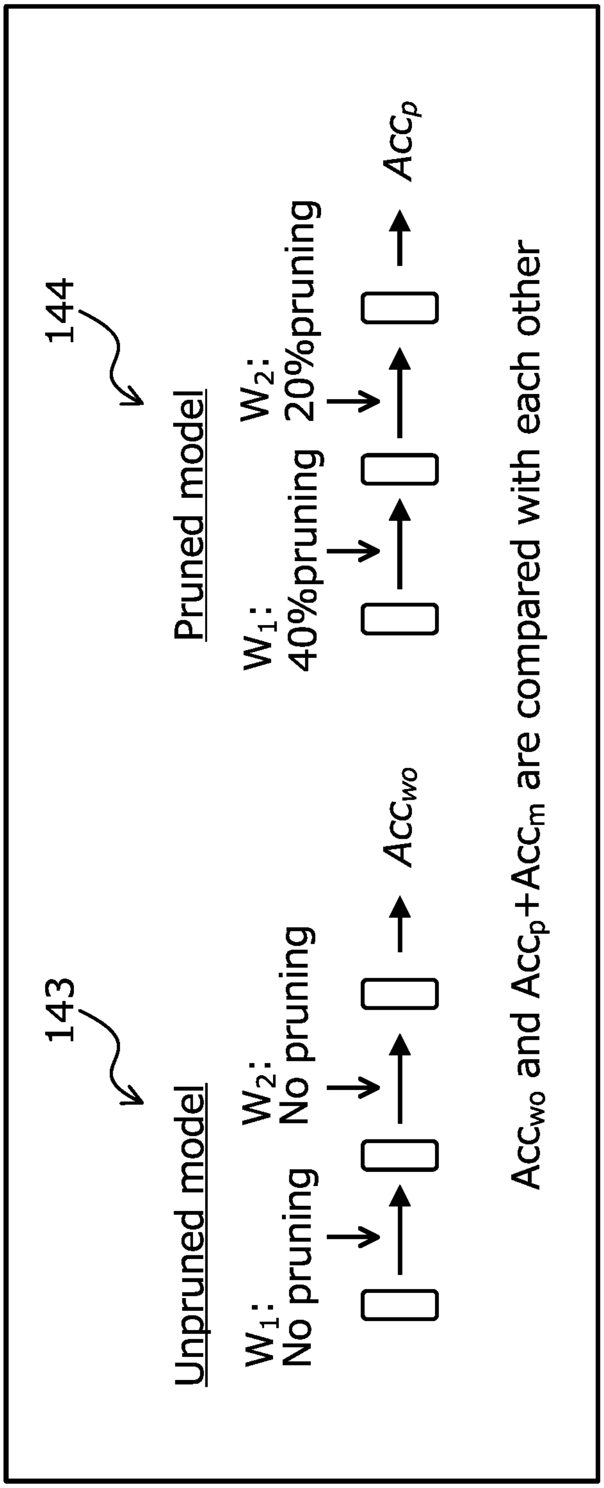
FIG. 6 is a diagram illustrating an example of calculating accuracy of models before and after pruning.

FIG. 6 is a diagram illustrating an example of calculating the accuracy of the model before and after the pruning. For example, the determining unit 14*b* calculates the accuracy $Acc_{wo}$ of the unpruned model (trained model 11*c*) for all layers ($W_1$, $W_2$, . . . ) (see arrow 143). The unpruned model may be regarded as a model that has been pruned by a pruning rate of 0% for each layer. The determining unit 14*b* calculates the accuracy $Acc_p$ of the model that has been pruned by the pruning rate ($W_1$=40%, $W_2$=20%, . . . ) calculated by (i) for each layer (see arrow 144).

If the sum $Acc_p+Acc_m$ of the accuracy is equal to or higher than the accuracy $Acc_{wo}$, the determining unit 14*b* determines to adopt the pruning rates determined in (i). For example, the determining unit 14*b* stores the pruning rates determined in (i) as the pruning rates 11*d* into the memory unit 11.

On the other hand, if the sum $Acc_p+Acc_m$ of the accuracy is lower than the accuracy $Acc_{wo}$, the determining unit 14*b* determines to discard the pruning rates determined in (i). For example, the determining unit 14*b* discards the pruning rates determined in (i) and determines to adopt the pruning rates 11*d* determined in the latest (ii) (or initial pruning rates 11*d*).

(iii) The calculating unit 14 (determining unit 14*b*) repeatedly applies (i) and (ii) multiple times to search for maximum pruning rates that can guarantee the accuracy.

Figure 7:
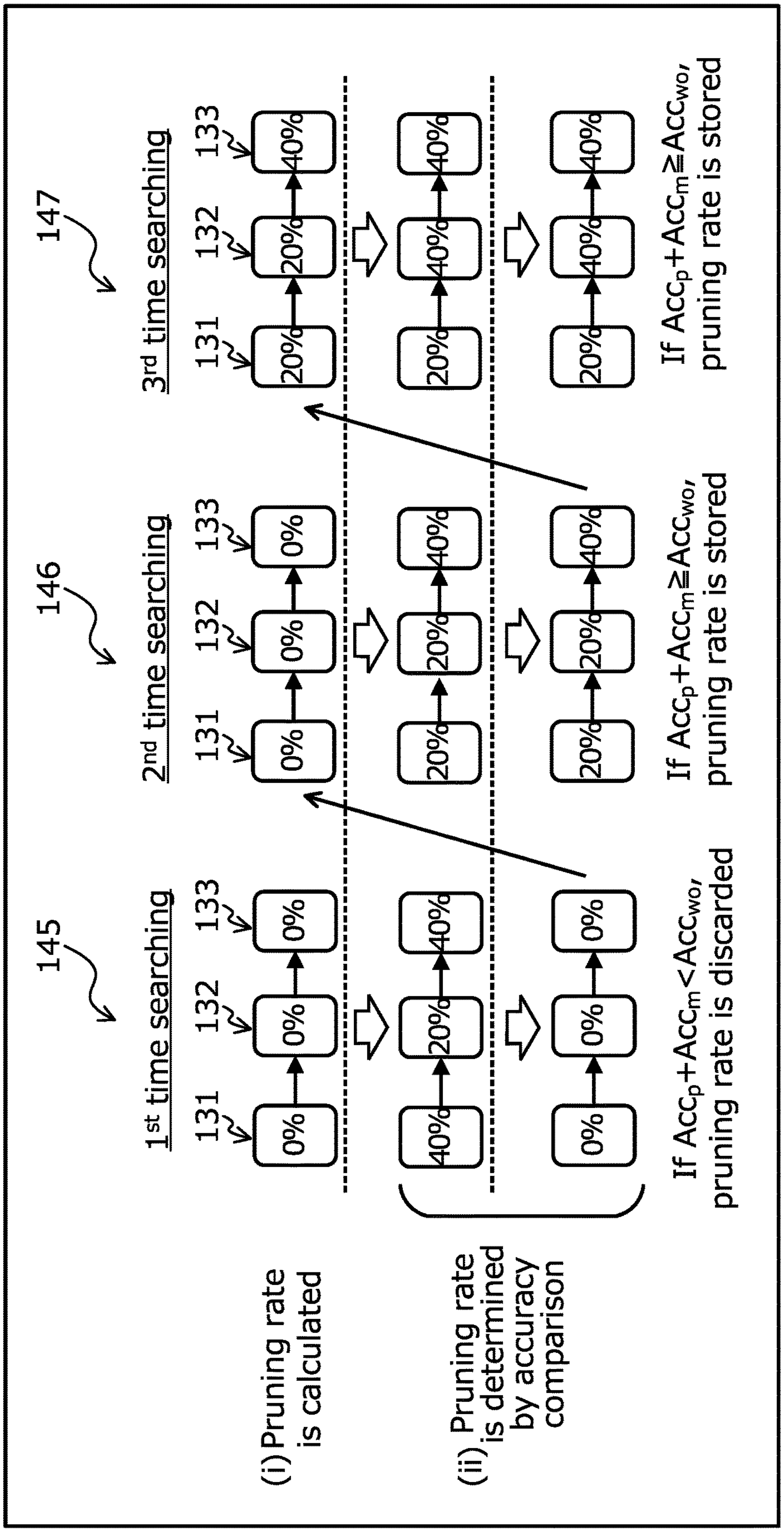
FIG. 7 is a diagram illustrating an example of a search for the pruning rates.

FIG. 7 is a diagram illustrating an example of a search for the pruning rates. The example of FIG. 7 illustrates a case where the calculating unit 14 uses the pruning rates for three layers (131 to 133) three times. For example, pruning a certain layer by a pruning rate of 20% means that if the layer has "four" elements (such as channels), "one" out of the "four" elements corresponding to the 20% of "four" is pruned.

As illustrated in FIG. 7, in the first time searching (see reference numeral 145), in (i), the threshold calculating unit 14*a* is assumed to calculate the threshold $T_w$ and to determine that, based on the threshold $T_w$, the pruning rates for the layers 131 to 133 are to be "40%, 20%, 40%" from "0%, 0%, 0%" (initial values). For example, in (ii), if the determining unit 14*b* determines $Acc_p+Acc_m<Acc_{wo}$ in comparing the inference accuracy, the determining unit 14*b* discards the pruning rates determined in (i) and adopts "0%, 0%, 0%" which are the values before the determination.

In the second time searching (see reference numeral 146), in (i), the threshold calculating unit 14*a* is assumed to calculate (update) the threshold $T_w$ and to determine that, based on the updated threshold $T_w$, the pruning rates for the layers 131 to 133 are to be "20%, 20%, 40%" from "0%, 0%, 0%". For example, in (ii), if the determining unit 14*b* determines $Acc_p+Acc_m$ $Acc_{wo}$ in comparing the inference accuracy, the determining unit 14*b* adopts "20%, 20%, 40%" and stores them as the pruning rates 11*d* into the memory unit 11.

In the third time searching (see reference numeral 147), in (i), the threshold calculating unit 14*a* is assumed to calculate (update) the threshold $T_W$ and to determine that, based on the updated threshold $T_W$, the pruning rates for the layers 131 to

133 are to be "20%, 40%, 40%" from "20%, 20%, 40%". For example, in (ii), if the determining unit 14*b* determines $Acc_p+Acc_m \geq Acc_{wo}$ in comparing the inference accuracy, the determining unit 14*b* adopts "20%, 40%, 40%" and stores (updates) them as the pruning rates 11*d* into the memory unit 11.

The determining unit 14*b* may search for the pruning rates over a predetermined number of times, for example, a preset number of times.

As described above, the determining unit 14*b* determines the reduction ratios to be applied one to each of the multiple layers based on the inference accuracy of the trained model 11*c* and the inference accuracy of the reduced model after the machine learning, which is obtained by reducing each element of the multiple layers in the trained model 11*c* according to the reduction ratio candidates to be applied.

Figure 8:
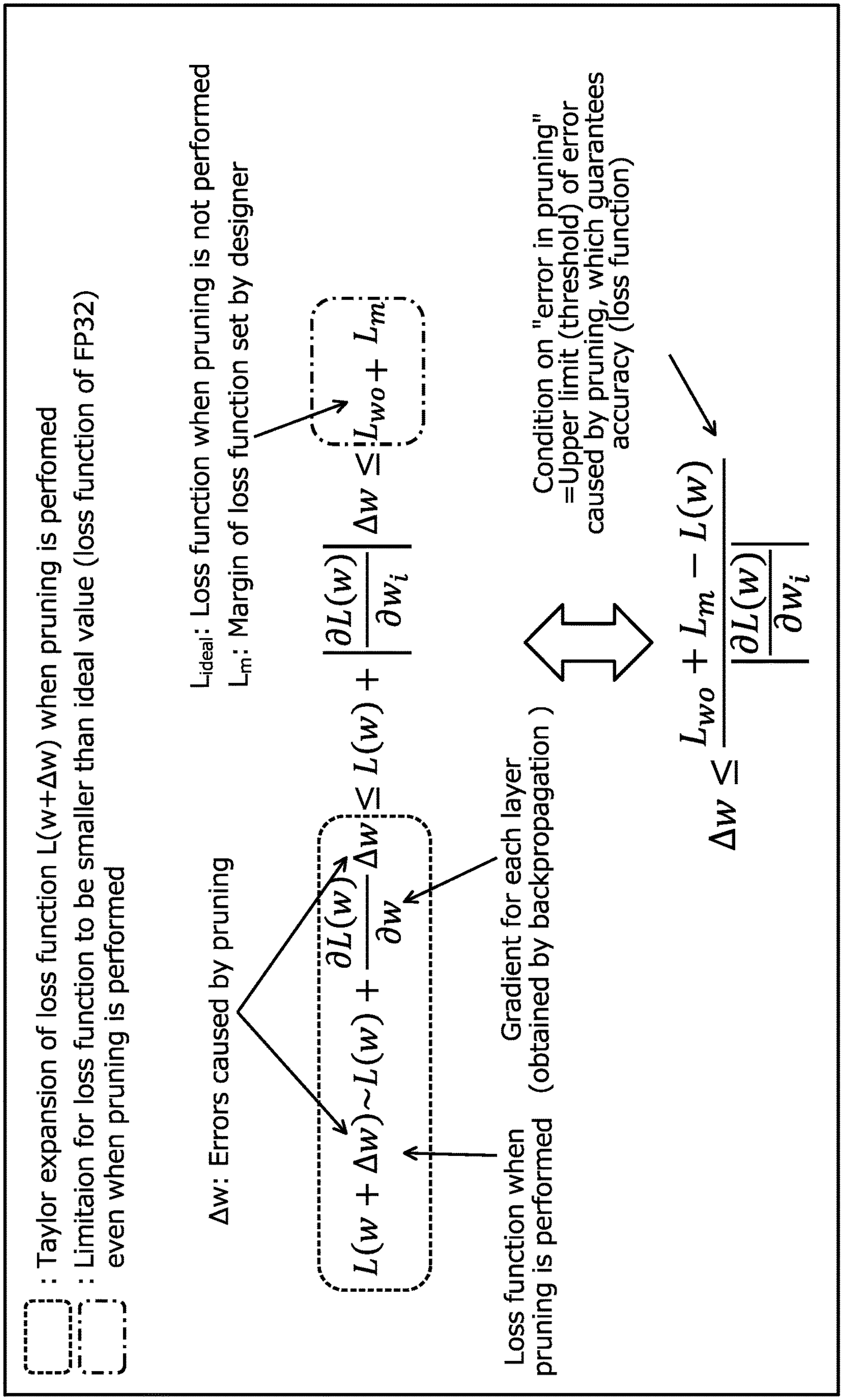
FIG. 8 is a diagram explaining an example of a method for deriving a threshold.
Figure 9:
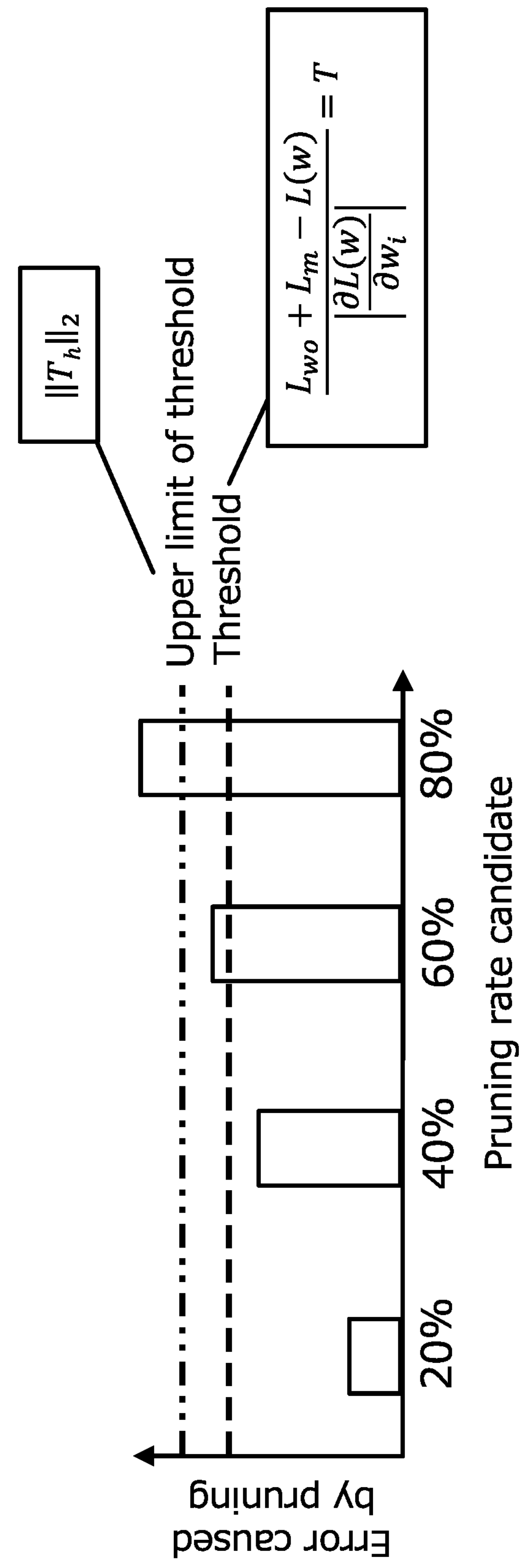
FIG. 9 is a diagram illustrating an example of the threshold and an upper limit of the threshold.

Next, description will be made in relation to a specific example of the pruning rate calculation process described above. FIG. 8 is a diagram explaining an example of a method for deriving a threshold, and FIG. 9 is a diagram illustrating an example of the threshold and the upper limit of the threshold.

The threshold calculating unit 14*a* performs first-order Taylor expansion on the loss function in the pruning to calculate the threshold of the pruning rate that can guarantee the accuracy for each layer. For example, assuming that: the error in the tensors for each layer, which error is generated by pruning, is Δw; the loss function in the pruning is L(w+Δw); the loss function of the model of the pruning target is L(w); and the loss function ($L_{ideal}$) without the pruning is $L_{wo}+L_m$, the threshold of the pruning rate that can guarantee the accuracy is calculated by the following equation (4). It should be noted that $L_{wo}$ is the loss function of the unpruned model, and $L_m$ is a margin of the loss function set by a designer.

[Equation 4]

$$L(w+\Delta w) \sim L(w) + \frac{\partial L(w)}{\partial w}\Delta w \leq L(w) + \left|\frac{\partial L(W)}{\partial w_i}\right|\Delta w \leq L_{wo} + L_m \tag{4}$$

The left side of the above equation (4) (see the dashed line box in FIG. 8) is the Taylor expansion of the loss function L(w+Δw) in the pruning, and includes a weight gradient "∂L(W)/∂w" of each layer of the pruning target. The gradient of each layer may be calculated by backpropagation. The right side of the above equation (4) (see the dash-dot line box in FIG. 8) is a limitation for the loss function to be smaller than an ideal value (for example, the loss function of FP32) even when pruning is performed.

As described above, the threshold calculating unit 14*a* calculates the thresholds T based on the values of the loss functions of the trained model 11*c* at the time of reducing elements of each of the multiple layers and the weight gradients of each of the multiple layers.

Rearranging the above equation (4) can derive, as expressed by the following equation (5), a condition of the "error in pruning", which satisfies the limitation for the loss function in the pruning to be smaller than the ideal loss function. In other words, it is possible to derive the upper limit (threshold) of the error caused by the pruning, which guarantees the accuracy (loss function). The threshold calculating unit 14*a* sets the right side of the following equation (5) to be the threshold T.

[Equation 5]

$$\Delta w \leq \frac{L_{wo} + L_m - L(w)}{\left|\frac{\partial L(W)}{\partial w_i}\right|} \tag{5}$$

As illustrated in FIG. 9, the threshold calculating unit 14*a* compares the threshold T set for each layer with the error in the L1 norm caused by the pruning. Then, the threshold calculating unit 14*a* determines to adopt the pruning rate candidate of the maximum value (40% in the example of FIG. 9) among the pruning rate candidates with errors smaller than the threshold T as the pruning rate resulted by (i).

As an example, in accordance with the following equation (6), the threshold calculating unit 14*a* may determine, for each layer of the pruning target, the pruning rate that causes a pruning error (left side) to be equal to or smaller than the threshold (right side). In the following equation (6), "$\|\Delta W\|_1$" is the L1 norm of the weight to be regarded as the pruning target and "n" is the number of elements of the weight of the layer in the pruning target.

[Equation 6]

$$\frac{\|\Delta W\|_1}{n} \leq \frac{L_{wo} + L_m - L(W)}{n}\sum_{i=1}^{n}\frac{1}{\left|\frac{\partial L(W)}{\partial w_i}\right|} \tag{6}$$

As illustrated in the above equation (6), the threshold T is to be a parameter derived by approximation. To prevent mistakes in determining the pruning rate due to an approximation error, an upper limit may be set for the threshold T (see FIG. 9). For example, the threshold calculating unit 14*a* may limit, based on a trust-region method, the magnitude of the threshold T by a "trust radius". The trust radius is an example of a threshold upper limit. As an example, the threshold calculating unit 14*a* may scale the thresholds T such that an L2 norm of the thresholds T of all layers become equal to or smaller than the trust radius. In the example of FIG. 9, $T_h$ represents a vector according to the threshold T of each layer and "$\|T_{h2}\|_2$" represents the L2 norm of the thresholds T of all layers.

For example, in accordance with the comparison result of the accuracy in the process of (ii) by the determining unit 14*b*, the threshold calculating unit 14*a* may update, in addition to the pruning rates, the trust radius (e.g., by multiplying it by a constant factor or the like). The initial value of the trust radius may be set by, for example, a designer or the like.

As an example, if the sum $Acc_p+Acc_m$ of the accuracy is equal to or higher than the accuracy $Acc_{wo}$, the threshold calculating unit 14*a* may multiply the trust radius by a constant K ("K>1.0"), and if the sum $Acc_p+Acc_m$ of the accuracy is lower than the accuracy $Acc_{wo}$, the threshold calculating unit 14*a* may multiply the trust radius by a constant k ("0<k<1.0").

<1-3> Explanation According to Type of Pruning Target

Next, description will be made in relation to examples of a method for pruning and a method for calculating the pruning error according to the type of the pruning target. The type of the pruning target may be, for example, channel pruning, node pruning, weight pruning, etc. According to the type of the pruning target, the calculating unit 14 may determine the pruning target and the pruning error by using the weight corresponding to the pruning target.

<1-3-1> Example of Channel Pruning

Figure 10:
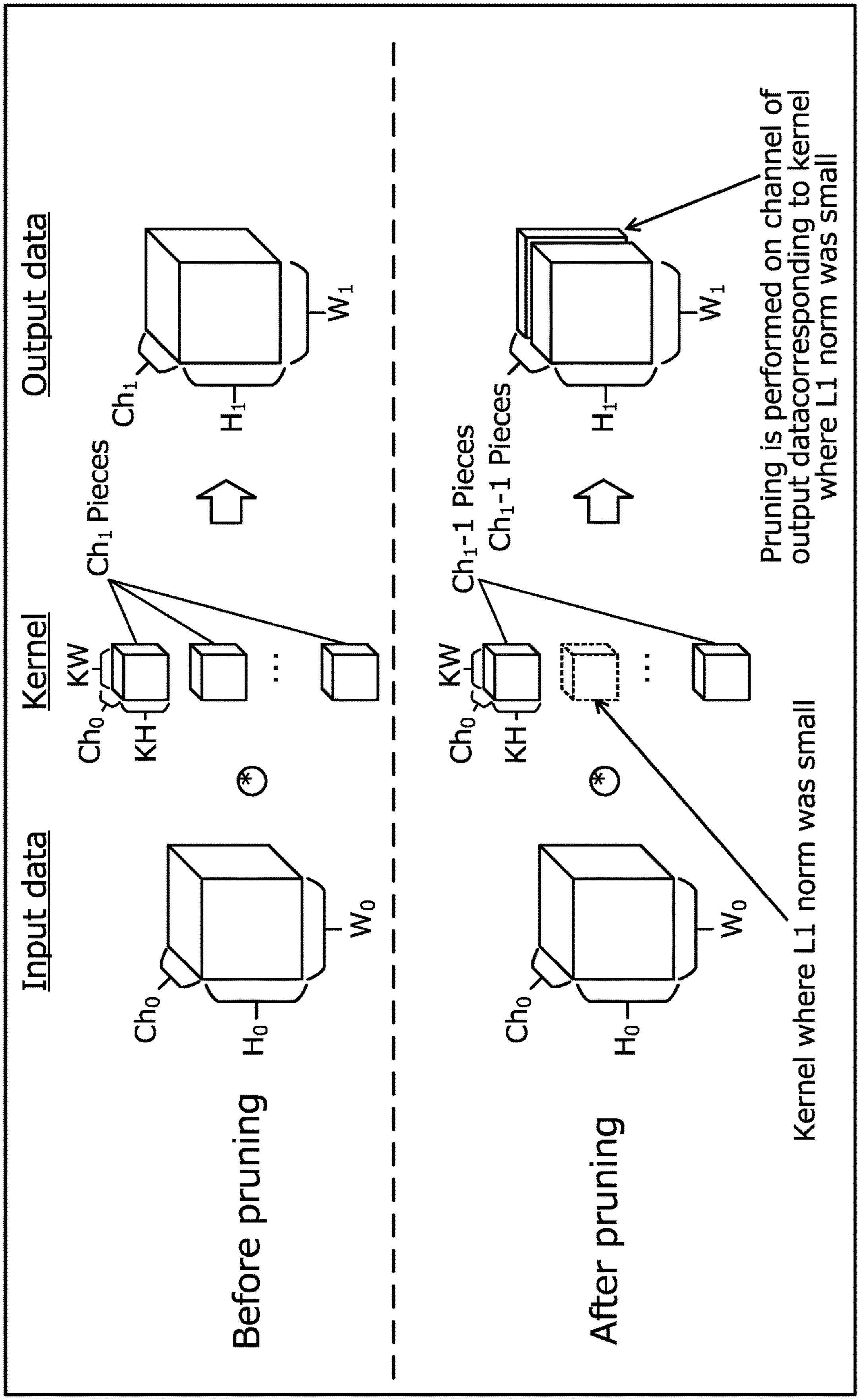
FIG. 10 is a diagram explaining an example of a method for determining a channel to be pruned.
Figure 11:
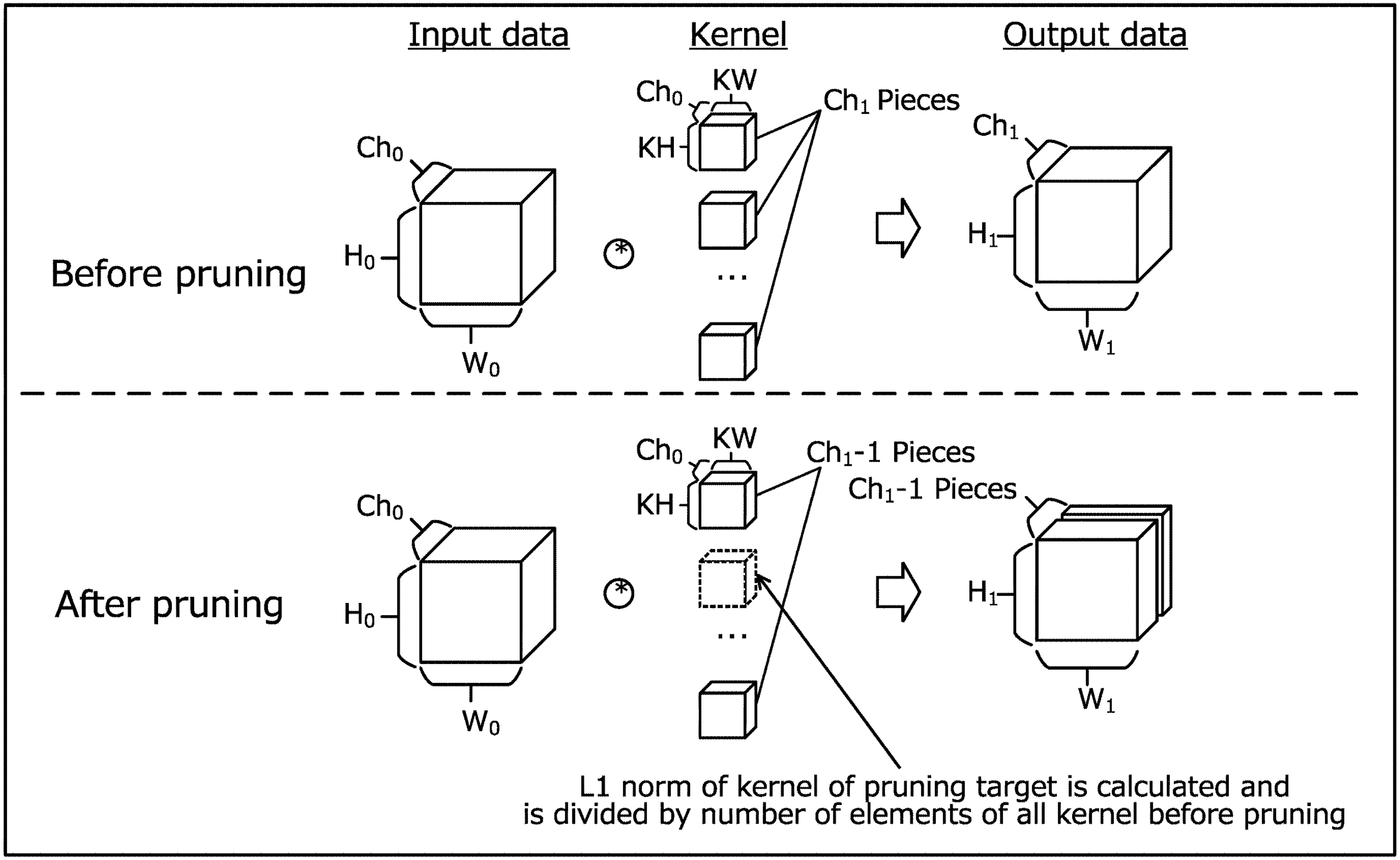
FIG. 11 is a diagram explaining an example of calculating a pruning error.

FIG. 10 is a diagram explaining an example of a method for determining a channel to be pruned and FIG. 11 is a diagram explaining an example of calculating the pruning error.

FIGS. 10 and 11 illustrate process flows of a convolution operation. Subscripted H and W indicate the sizes of input data, kernels, and output data, and subscripted Ch indicates the number of channels of the input data, the kernels, and the output data. Hereinafter, the same applies to the description of other type of pruning target.

(Example of Method for Determining Channel to be Pruned)

When the type of the pruning target is the channel, the calculating unit 14 calculates the L1 norm in units of kernels corresponding to the channels of the output data. For example, the calculating unit 14 calculates, as illustrated by "before pruning" in FIG. 10, the respective L1 norms for all of $Ch_1$ kernels before the pruning. As a result, $Ch_1$ L1 norms are calculated.

Next, as illustrated by "after pruning" in FIG. 10, the calculating unit 14 prunes the channel of the corresponding output data according to the set pruning rate in ascending order of the calculated L1 norms.

(Example of Calculating Pruning Error)

As illustrated in FIG. 11, the calculating unit 14 calculates the L1 norm of the kernel of the pruning target. The L1 norm of the kernel of the pruning target is the value obtained by subtracting the L1 norms of all kernels after pruning from the L1 norms of all kernels before pruning, that is, the difference in the L1 norms between before and after the pruning.

The calculating unit 14 may obtain the pruning error by dividing the calculated L1 norm by the number of elements of all kernels before the pruning.

<1-3-2> Example of Node Pruning

Figure 12:
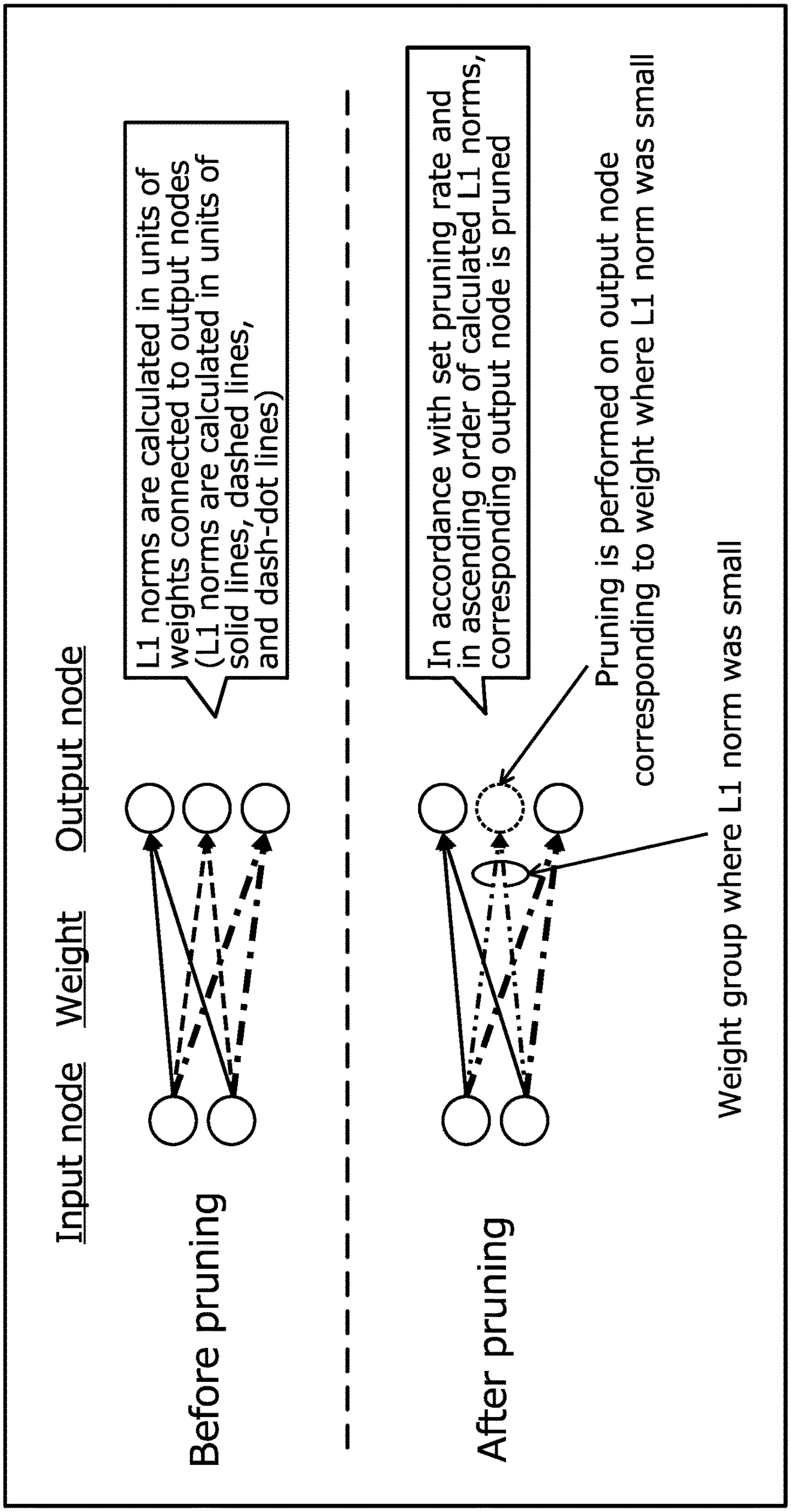
FIG. 12 is a diagram explaining an example of a method for determining a node to be pruned.
Figure 13:
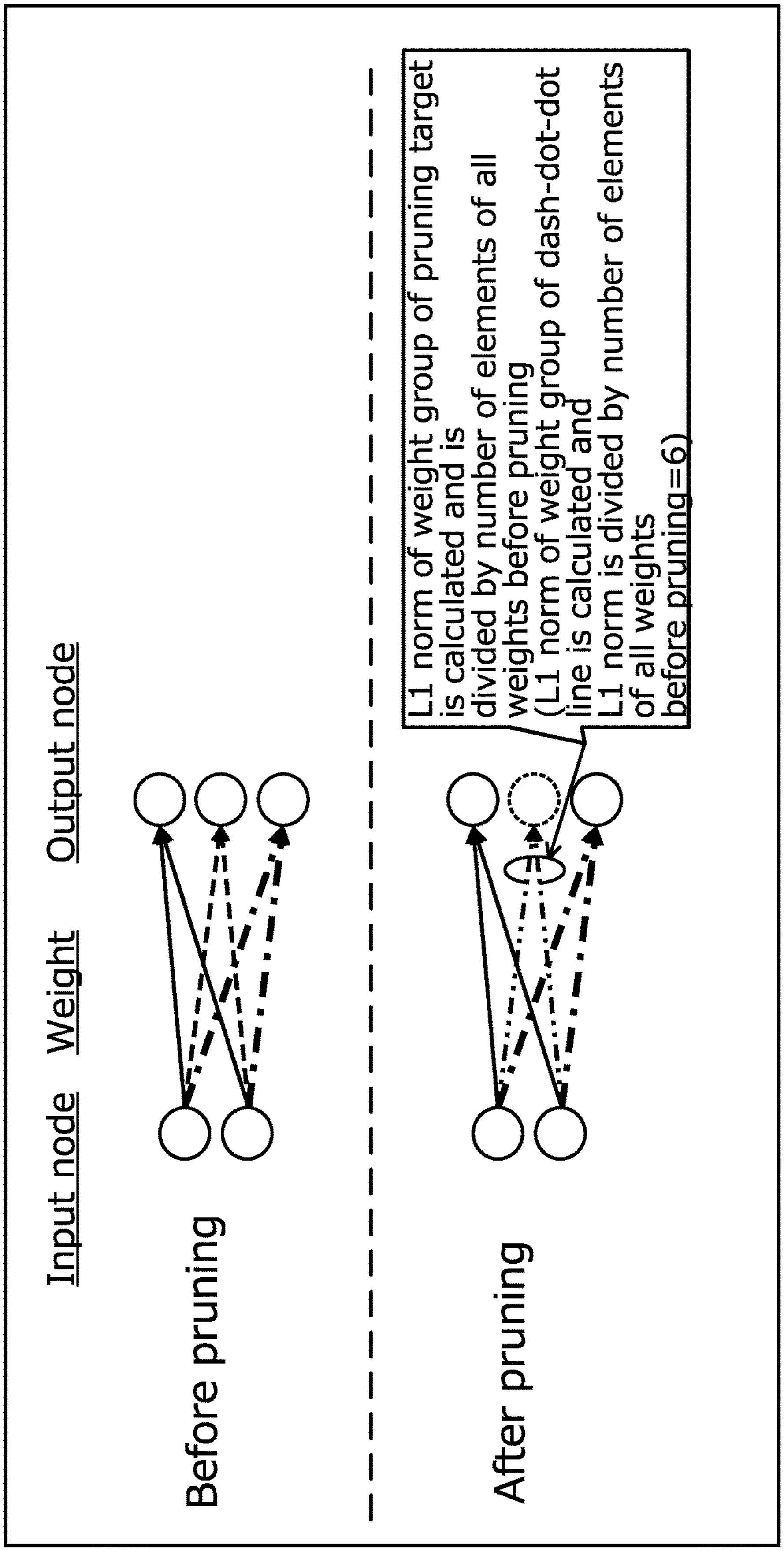
FIG. 13 is a diagram explaining an example of calculating a pruning error.

FIG. 12 is a diagram explaining an example of a method for determining the node to be pruned and FIG. 13 is a diagram explaining an example of calculating the pruning error.

(Example of Method for Determining Node to be Pruned)

When the type of the pruning target is the node, the calculating unit 14 calculates the L1 norm in units of weights connected to the output node. In the example of "before pruning" in FIG. 12, the calculating unit 14 calculates the L1 norm in each unit of solid lines, dashed lines, and dash-dot lines.

Next, as illustrated by "after pruning" in FIG. 12, the calculating unit 14 prunes the corresponding output node according to the set pruning rate in ascending order of the calculated L1 norms. For example, the calculating unit 14 determines that the output node corresponding to a weight group where the L1 norm was small is the node of the pruning target.

(Example of Calculating Pruning Error)

As illustrated in FIG. 13, the calculating unit 14 calculates the L1 norm of the weight group of the pruning target. The L1 norm of the weight group of the pruning target is obtained by subtracting the L1 norms of all weights after the pruning from the L1 norms of all weights before the pruning.

The calculating unit 14 may acquire the pruning error by dividing the calculated L1 norm by the number of elements of all weights before the pruning. In the example of "after pruning" in FIG. 13, the calculating unit 14 calculates the L1 norm of the weight group indicated by the dash-dot-dot line and divides the L1 norm by the number of elements (="6"; the number of lines) of all weights before the pruning.

<1-3-3> Example of Weight Pruning

Figure 14:
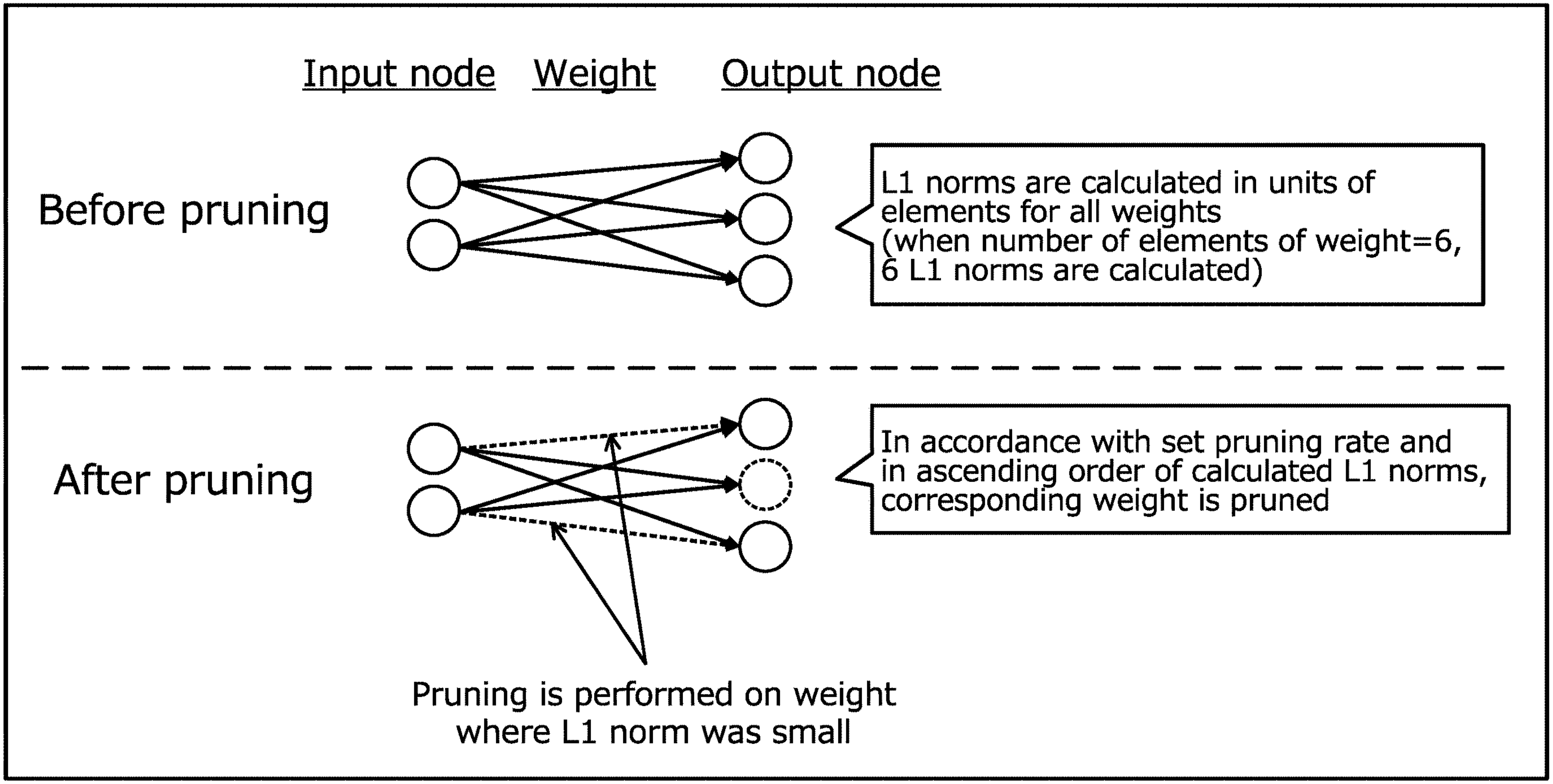
FIG. 14 is a diagram explaining an example of a method for determining a weight to be pruned.
Figure 15:
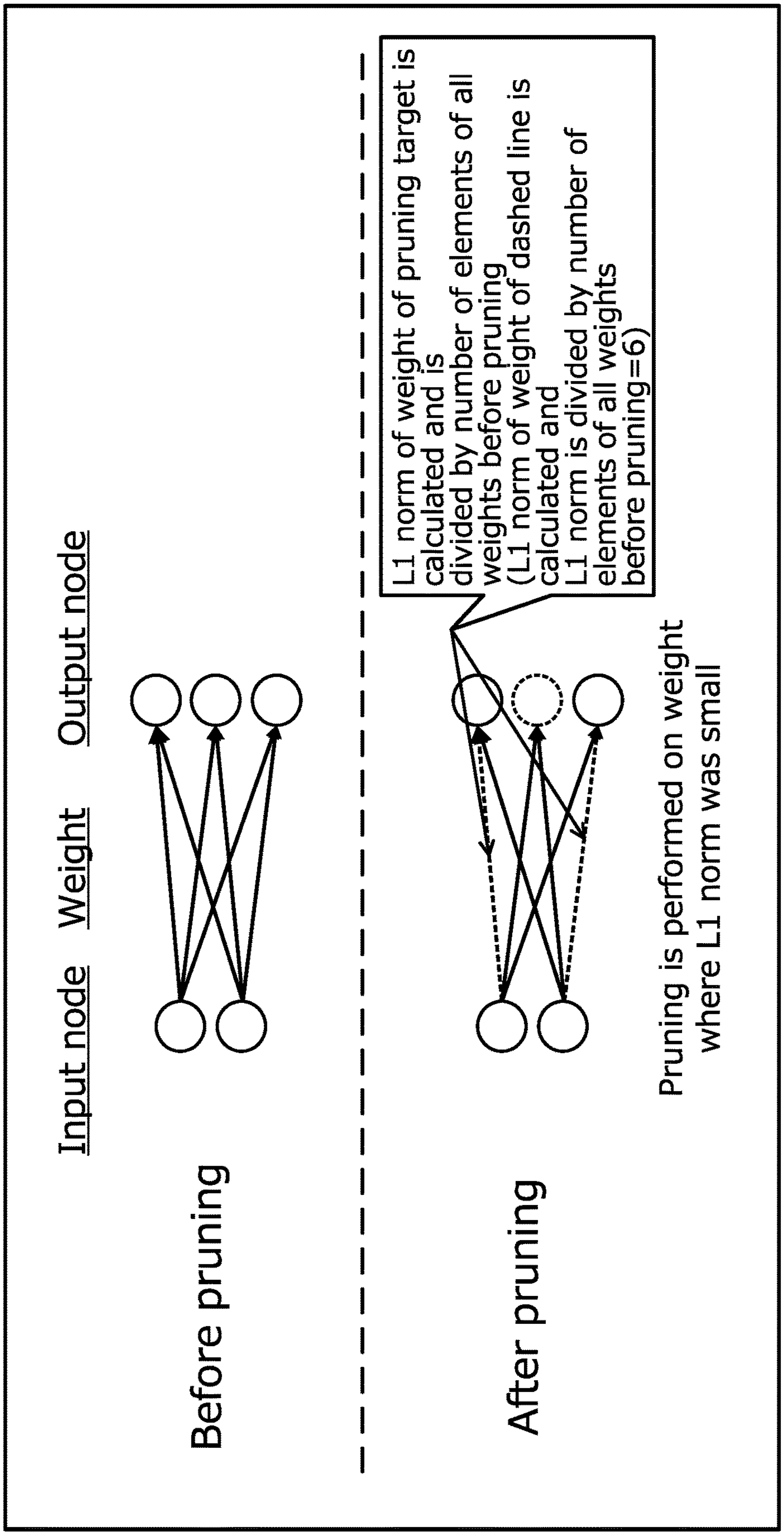
FIG. 15 is a diagram explaining an example of calculating a pruning error.

FIG. 14 is a diagram illustrating an example of a method for determining a weight to be pruned and FIG. 15 is a diagram illustrating an example of calculating the pruning error.

(Example of Method for Determining Weight to be Pruned)

When the type of the pruning target is the weight, the calculating unit 14 calculates the L1 norms for all of the weights in units of elements. In the example of "before pruning" in FIG. 14, since the number of elements of the weight is "6", the calculating unit 14 calculates "6" L1 norms.

Next, as illustrated by "after pruning" in FIG. 14, the calculating unit 14 prunes the corresponding weight according to the set pruning rate in ascending order of the calculated L1 norms. For example, the calculating unit 14 determines that the weight where L1 norm was small is the weight to be pruned.

(Example of Calculating Pruning Error)

As illustrated in FIG. 15, the calculating unit 14 calculates the L1 norm of the weight of the pruning target. The L1 norm of the weight of the pruning target is obtained by subtracting the L1 norms of all weights after the pruning from the L1 norms of all weights before the pruning.

The calculating unit 14 may acquire the pruning error by dividing the calculated L1 norm by the number of elements of all weights before the pruning. In the example of "after pruning" in FIG. 15, the calculating unit 14 calculates the L1 norm of the weight indicated by the dashed line and divides the L1 norm by the number of elements (="6"; the number of lines) of all weights before the pruning.

<1-4> Pruning Process of NN Having Attention Mechanism

Figure 16:
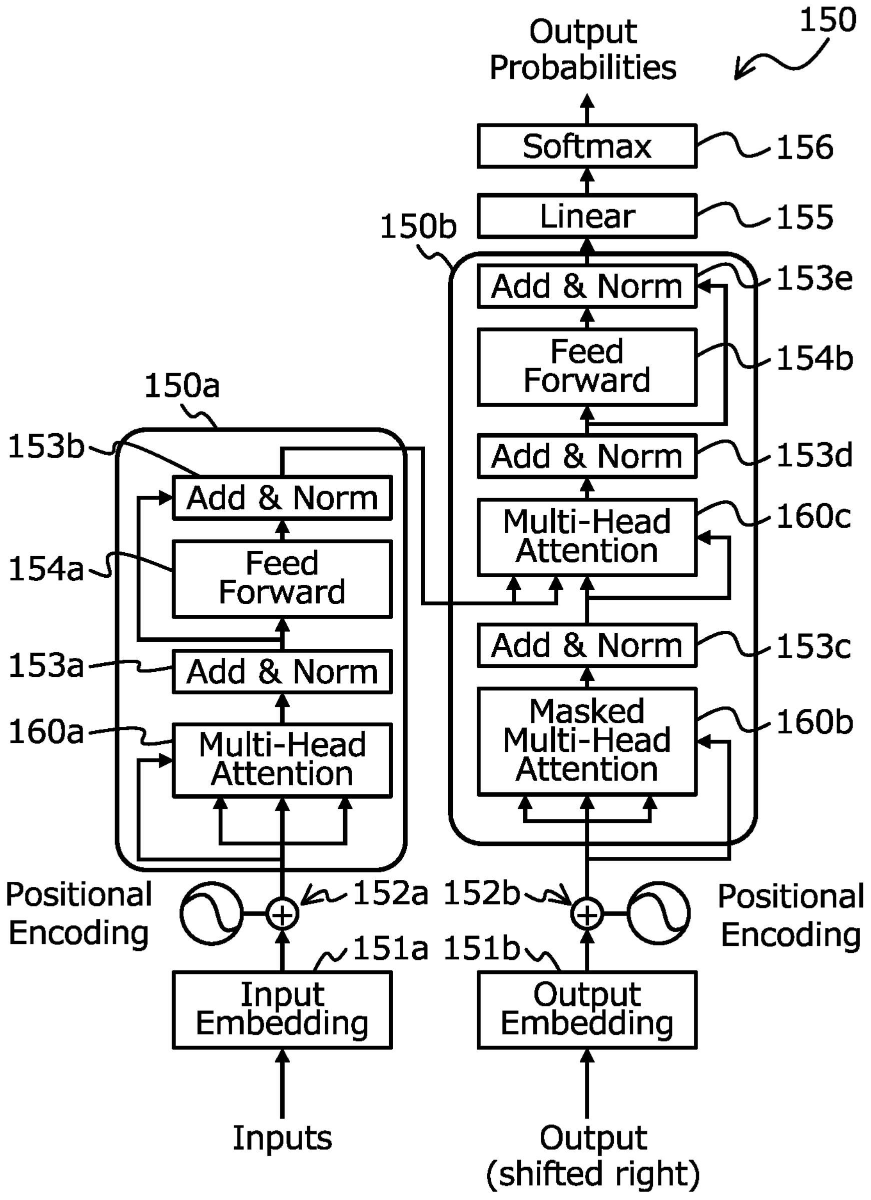
FIG. 16 is a diagram illustrating an example of a NN having an attention mechanism.

FIG. 16 is a diagram illustrating an example of a NN 150 having an attention mechanism 160. FIG. 16 assumes an example in which the NN 150 is a NN called a Transformer. The NN 150 is not limited to a Transformer, and may alternatively be any NN having the attention mechanism 160.

The NN 150 includes an Embedding layers 151*a* and 151*b*, Positional Encodings 152*a* and 152*b*, an encoder 150*a*, a decoder 150*b*, fully-connected layer (represented by "Linear" in FIG. 16) 155, and a Softmax 156.

The encoder 150*a* includes Add&Norms 153*a* and 153*b*, a Feed Forward 154*a*, and an MHA 160*a*. The decoder 150*b* includes Add&Norms 153*c*, 153*d* and 153*e*, a Feed Forward 154*b*, an MMHA (Masked MHA) 160*b*, and an MHA 160*c*. Since a Transformer is a known NN, the explanation of each layer in the NN 150 is omitted here.

In the NN 150 illustrated in FIG. 16, each of the MHA 160*a*, the MMHA 160*b*, and the MHA 160*c* is an example of the attention mechanism 160.

Figure 17:
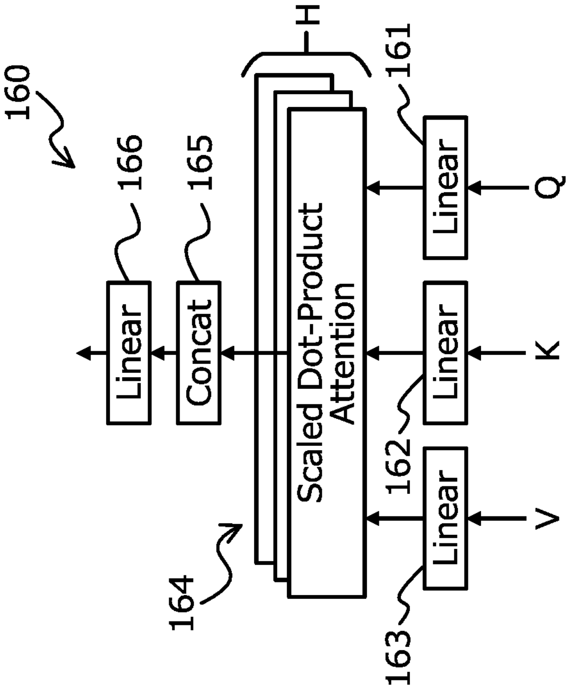
FIG. 17 is a diagram illustrating an example of an attention mechanism.

FIG. 17 is a diagram illustrating an example of an attention mechanism 160. An input tensor having two dimensions of a token and a feature is input into the attention mechanism 160. The feature is an example of the number of elements.

The following description assumes that the attention mechanism 160 is an MHA structure as an example, but the attention mechanism 160 is not limited thereto. Alternatively, the attention mechanism 160 may be a mechanism having a head, i.e., a single-head attention mechanism.

As illustrated in FIG. 17, the attention mechanism 160 includes fully-connected layers 161-163, and 166, an attention layer 164, and a concat unit (represented by "Concat" in FIG. 17) 165.

The fully-connected layers 161-163 are examples of an input part of the attention mechanism 160, and are layers that perform arithmetic operations on input tensors and output tensors of the Q, the K, and the V, respectively. In the following description, a fully-connected layer 161 that outputs the tensor of the Q may be referred to as the Q layer, the fully-connected layer 162 that outputs the tensor of the K may be referred to as the K layer, and the fully-connected layer 163 that outputs the tensor of the V may be referred to as the V layer.

The attention layer 164 includes, for example, a layer (structure) called a Scaled Dot-Product Attention. In Example illustrated in FIG. 17, the attention layer 164 may include H (an integer of one or more) scaled inner product attentions that are the same as the number of headers.

The concat unit 165 is an example of a concatenating unit, and performs a concat arithmetic operation that concatenates multiple tensors input from the attention layer 164 and outputs a tensor serving as the result of the concatenating.

The fully-connected layer 166 performs an arithmetic operation on the tensor inputted from the concat unit 165, and outputs a tensor serving as the result of the arithmetic operation.

Figure 18:
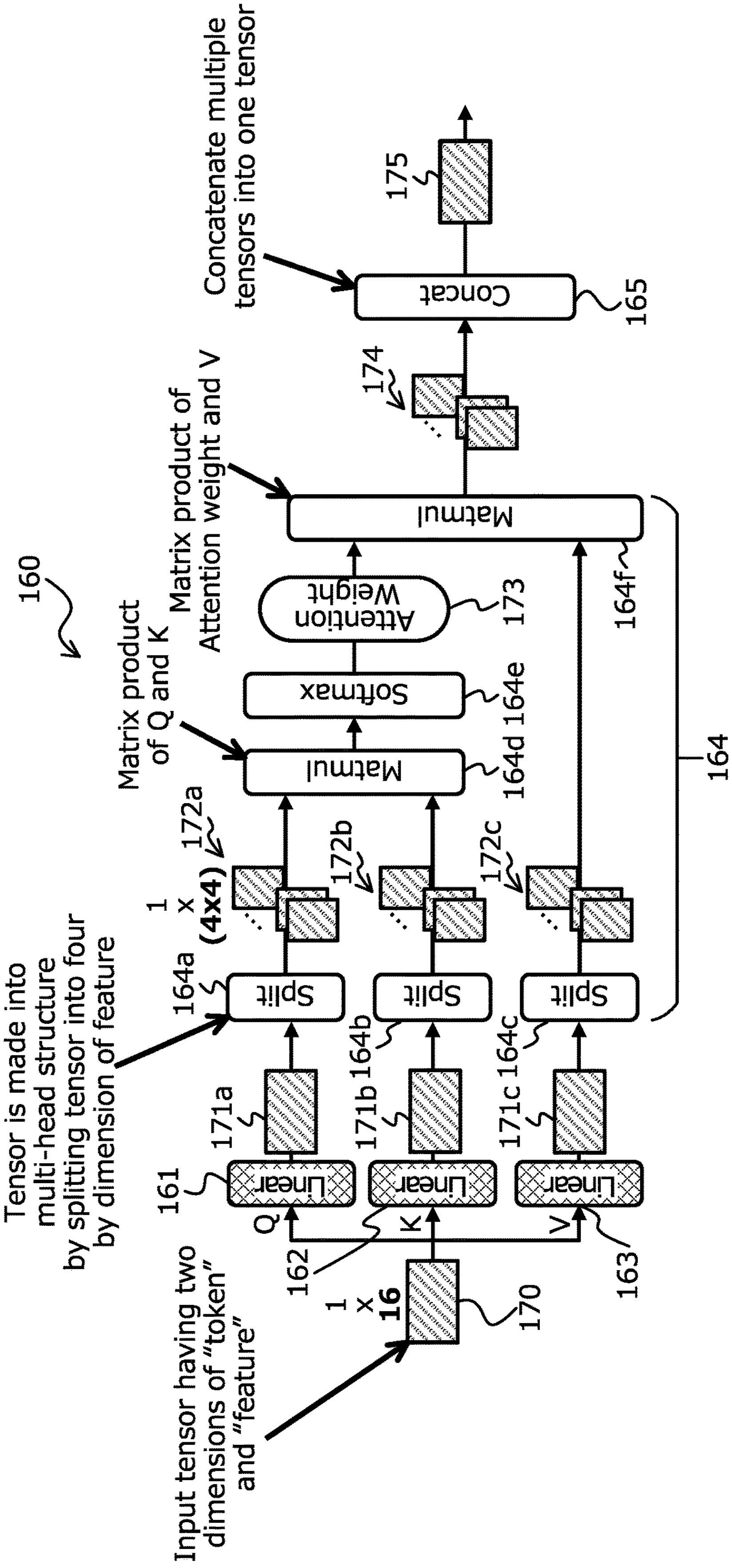
FIG. 18 is a diagram illustrating a detailed example of an attention mechanism.

FIG. 18 is a diagram illustrating a detailed example of the attention mechanism 160. The example of FIG. 18 assumes that the attention mechanism 160 is an MHA that uses, as an input, an input tensor 170 with the number of tokens being one and the number of features being 16 and that also has the number H of heads being four.

The Q layer outputs a tensor 171*a* of the Q, using the input tensor 170 as an input. The K layer outputs a tensor 171*b* of the K, using the input tensor 170 as an input. The V layer outputs a tensor 171*c* of the V, using the input tensor 170 as an input.

The attention layers 164 may include Splits 164*a*-164*c*, Matmuls 164*d* and 164*f*, and a Softmax 164*e*.

The Splits 164*a* to 164*c* make the tensors 171*a*-171*c*, respectively, into multi-head structures by splitting the tensors 171*a*-171*c* into the number H of heads by the dimension of the features.

For example, the Split 164*a* splits the tensor 171*a* including a 16-dimensional feature, serving as an input, into four tensors corresponding to the number of heads, and outputs four four-dimensional tensors 172*a*. The Split 164*b* splits the tensor 171*b* including a 16-dimensional feature, serving as an input, into four tensors corresponding to the number of heads, and outputs four four-dimensional tensors 172*b*. The Split 164*c* splits the tensor 171*c* including a 16-dimensional feature, serving as an input, into four tensors corresponding to the number of heads, and outputs four four-dimensional tensors 172*c*.

The Matmul 164*d* calculates the matrix product of the Q and the K by using the tensors 172*a* of the Q and the tensors 172*b* of the K as inputs.

For example, representing the tensor 172*a* of the Q by $Q_{head}$, the elements of $Q_{head}$ by $q_f$, the tensor 172*b* of the K by $K_{head}$, the elements of $K_{head}$ by $k_f$, and the matrix product calculated by the Matmul 164*d* by $A_{head}$, the matrix product $A_{head}$ is calculated as follows. A subscript head represents an index of each head, and is an integer of 0 to 3 in the example of FIG. 18. A subscript f represents an index of each feature, and is an integer of 0 to 15 in the example of FIG. 18.

$$A_0=Q_0\cdot K_0^T=q_0\cdot k_0+q_1\cdot k_1+q_2\cdot k_2+q_3\cdot k_3$$

$$A_1=Q_1\cdot K_1^T=q_4\cdot k_4+q_5\cdot k_5+q_6\cdot k_6+q_7\cdot k_7$$

$$A_2=Q_2\cdot K_2^T=q_8\cdot k_8+q_9\cdot k_9+q_{10}\cdot k_{10}+q_1\cdot k_{11}$$

$$A_3=Q_3\cdot K_3^T=q_{12}\cdot k_{12}+q_{13}\cdot k_{13}+q_{14}\cdot k_{14}+q_{15}\cdot k_{15}$$

As described above, the arithmetic operation for a matrix product in the Matmul 164*d* calculates a product (inner product) of the elements of the same index between the Q and the K.

Accordingly, it can be said that the following constraint 1' and constraint 2 are imposed on the attention mechanism 160.

Constraint 1': The number of heads of $Q_{head}$ and the number of heads of $K_{head}$ are the same (the same number).

Constraint 2: The number of features of the head $Q_{head}$ and the number of features of the head $K_{head}$ are the same (same number).

The Softmax 164*e* outputs an Att (Attention Weight) 173 by normalizing the matrix product calculated by the Matmul 164*d*. For example, the Softmax 164*e* may calculate the Att 173 according to the following expression:

$$\text{Att}=\text{Softmax}(A_{head})$$

Alternatively, the Softmax 164*e* may calculate the Att 173 according to the following expression: In the following expression, the term $d_x$ is the number of dimensions of $A_{head}$ (four in the example of FIG. 18) and the term Softmax{ } is a normalization function.

$$\text{Att}=\text{Softmax}\{A_{head}/\sqrt{(d_x)}\}$$

The Matmul 164*f* calculates the matrix product of the weight (Att 173) and the V by using the Att 173 and the tensor 172*c* of the V as inputs. For example, the Matmul 164*f* outputs four tensors 174 as the result of calculating the matrix product.

For example, representing the Att 173 by $An_{head}$, the tensor 172*c* of the V by $V_{head}$, the element of $V_{head}$ by $v_f$, and the matrix product calculated by the Matmul 164*f* by $C_{head}$, the matrix product $C_{head}$ is calculated as follows:

$$C_0=An_0\cdot V_0=[An_0\cdot v_0,An_0\cdot v_1,An_0\cdot v_2,An_0\cdot v_3]$$

$$C_1=An_1\cdot V_1=[An_1\cdot v_4,An_1\cdot v_5,An_1\cdot v_6,An_1\cdot v_7]$$

$$C_2=An_2\cdot V_2=[An_2\cdot v_8,An_2\cdot v_9,An_2\cdot v_{10},An_2\cdot v_{11}]$$

$$C_3=An_3\cdot V_3=[An_3\cdot v_{12},An_3\cdot v_{13},An_3\cdot v_{14},An_3\cdot v_{15}]$$

As described above, the arithmetic operation for a matrix product in the Matmul 164*f* calculates a product (inner product) of the indexes of the same head between the weight (Att 173) and the V.

Accordingly, it can be said that the following constraint 1" is imposed on the attention mechanism 160.

Constraint 1": The number of heads of the weight ($Q_{head}$ and $K_{head}$) and the number of heads of $V_{head}$ are the same (the same number).

The Constraint 1' and the constraint 1" may be integrated into the following constraint 1.

Constraint 1: The number of heads of $Q_{head}$, the number of heads of $K_{head}$, and the number of heads of $V_{head}$ are the same (same number).

The concat unit 165 concatenates elements of multiple (four in the example of FIG. 18) tensors 174 (mini-tensors) and outputs one tensor 175.

For example, assuming that the result (tensor 175) of the concatenation by the concat unit 165 is represented by C, the result C is calculated as follows:

$$C = [C_0, C_1, C_2, C_3] = [An_0 \cdot v_0, An_0 \cdot v_1, An_0 \cdot v_2, An_0 \cdot v_3, An_1 \cdot v_4, An_1 \cdot v_5, An_1 \cdot v_6, An_1 \cdot v_7, An_2 \cdot v_8, An_2 \cdot v_9, An_2 \cdot v_{10}, An_2 \cdot v_{11}, An_3 \cdot v_{12}, An_3 \cdot v_{13}, An_3 \cdot v_{14}, An_3 \cdot v_{15}]$$

As described above, the calculation (concat arithmetic operation) of concatenation in the concat unit 165 is premised on that the tensor size (the number of elements of each dimension) are all the same in the tensor 175 ($C_0$, $C_1$, $C_2$, $C_3$) inputted to concat unit 165.

Accordingly, it can be said that the following constraint 3 is imposed on the attention mechanism 160.

Constraint 3: The number of features in the heads of $V_{head}$ is the same (the same number).

Therefore, in order to obtain the tensor 175 by inputting the input tensors 170 into the attention mechanism 160, the above constraint 1 to constraint 3 have to be satisfied. If the attention mechanism 160 is a single-head attention structure, the constraint is only the following constraint 2' instead of the constraint 1 to constraint 3.

Constraint 2': The number of features is the same (the same number) between $Q_{head}$ and $K_{head}$.

Here, the following description assumes that the pruning rates of the fully-connected layers 161-163 (Q layer, K layer, and the V layer) are independently of each other selected (e.g., selected such that at least one of the pruning rates is different) in the pruning method by the pruning rate calculating unit 14 described with reference to FIGS. 5-9.

In this case, at least one of the tensors 171*a* to 171*c* output from fully-connected layers 161 to 163 has a tensor size different from the tensor size of the remaining tensors, which makes it impossible to calculate the Att 173 and the tensor 175. In addition, since the pruning is performed independently of each other on all the layers of the machine learning model, it is difficult to grasp, prior to the pruning, which one of the Q layer, the K layer, and the V layer in the attention mechanism 160 has the maximum number of output nodes.

In order to avoid a circumstance where the Att 173 and the tensor 175 are unable to be calculated, one example of a remedy is to uniformly exclude the fully-connected layers 161 to 163 in the attention mechanism 160 from the targets of determining the pruning rate. However, in this case, as the number of attention mechanisms included in a NN increases, the pruning rate of the entire machine learning model of the NN lowers, and the effect of compressing (downsizing) of the data size of the machine learning model by pruning is lowered.

As solution to the above, the calculating unit 14 of the one embodiment inserts a zero padding layer at the output-side (downstream side) of each of the fully-connected layers 161 and 162 (the fully-connected layers 161-163 if the attention mechanism 160 has an MHA configuration).

A zero padding layer is a layer for padding a predetermined element (for example, a channel) of a tensor with "0" (zero).

Padding is an operation of increasing the size (for example, the number of channels) of a tensor by embedding a value such as zero in the tensor. A zero padding layer is an example of a padding layer that performs padding on one or more elements of a tensor. The padding layer is not limited to a zero padding layer, and a layer that embeds various values such as values close to "0" in a tensor may be used.

Figure 19:
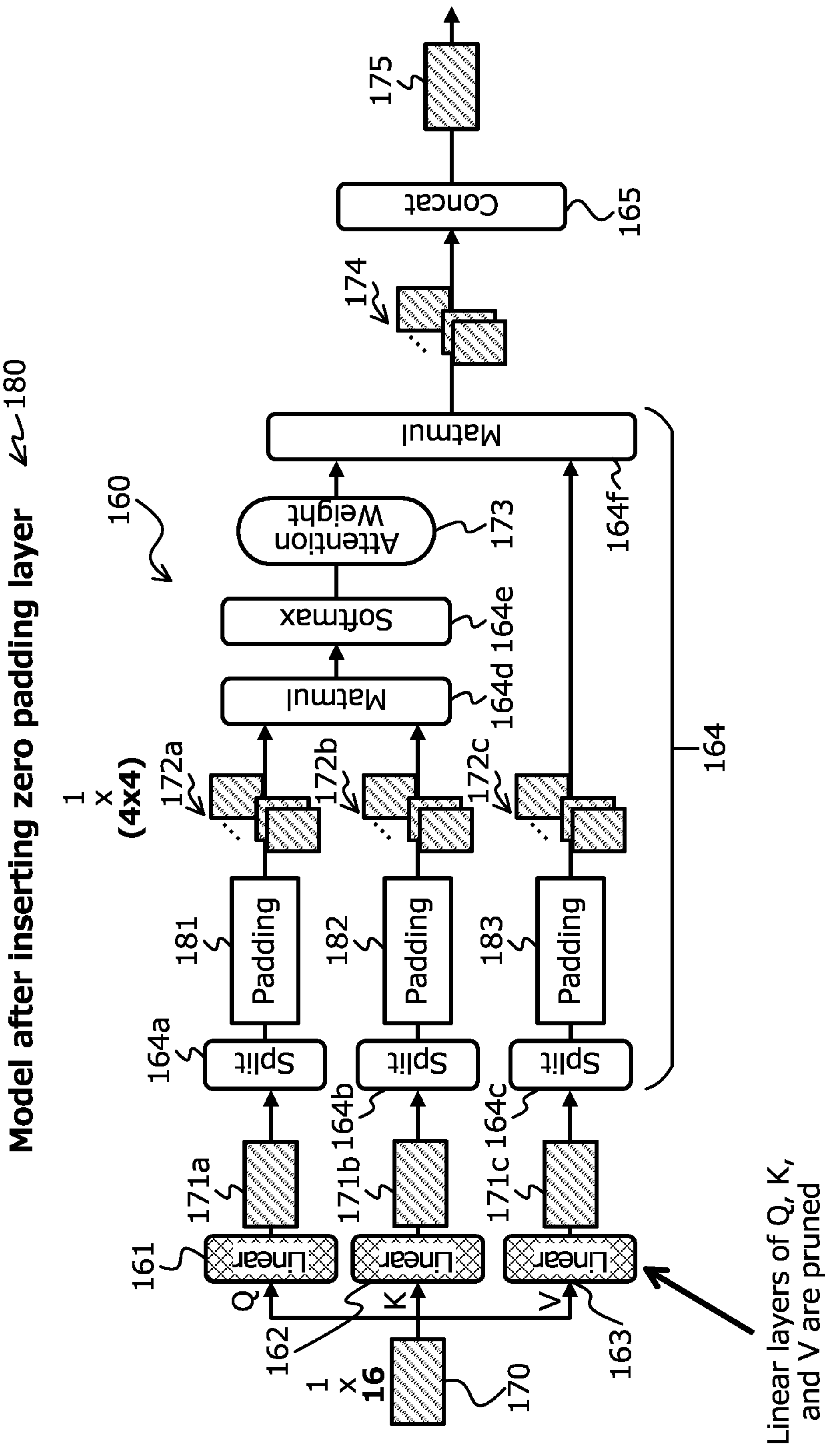
FIG. 19 is a diagram illustrating an example of inserting a zero padding layer into a model.

FIG. 19 is a diagram illustrating an example of inserting a zero padding layer into a model. For example, FIG. 19 illustrates a model 180 after zero padding layers are inserted into the NN 150 including the attention mechanism 160 illustrated in FIG. 18.

The process illustrated in FIG. 19 may be executed using selecting pruning rate candidates if the NN 150 of the pruning target includes the attention mechanism 160, or may be suppressed from being executed if the NN 150 of the pruning target does not include the attention mechanism 160. For example, the calculating unit 14 may determine whether or not the NN 150 includes the attention mechanism 160 by referring to configuration information (not illustrated) that defines the configuration of NN 150, such as respective layers and the connections between the layers. Further, the calculating unit 14 may identify the fully-connected layers 161 to 163 for each attention mechanism 160 on the basis of the configuration information.

Furthermore, FIG. 19 assumes an example that, in the above procedure (i), the calculating unit 14 calculates the L1 norm in a unit of a kernel corresponding to a channel of output data and provisionally calculates the pruning rate by the L1 regularization learning (see FIG. 2).

As illustrated in FIG. 19, the calculating unit 14 inserts (arranges) zero padding layers (denoted by "Padding" in FIG. 19) 181 to 183 on the respective downstream sides of the fully-connected layers 161 to 163 (Q layer, K layer, and V layer), e.g., on the downstream sides of the Splits 164*a* to 164*c*. Then, if the attention mechanism 160 is an MHA structure, the calculating unit 14 performs zero padding with at least one of the zero padding layers 181 to 183 such that all the following conditions (I) to (III). For example, the calculating unit 14 may specify the number of channels of the Q layer, the number of channels of the K layer, and the number of channels of the V layer based on the provisionally calculated pruning rate, and determine the number of channels to be subjected to zero padding in accordance with the specified number of channels of each layer.

(I) The tensor 172*a* from the reduced Q layer after reduction of elements based on a first reduction ratio, the tensor 172*b* from the reduced K layer after reduction of elements based on a second reduction ratio, and the tensor 172*c* from the reduced V layer after reduction of elements based on a third reduction ratio have the same number of heads.

(II) The same head of the tensor 172*a* and the tensor 172*b* have the same number of elements.

(III) The heads of the tensor 172*c* have the same number of elements.

In addition, if the attention mechanism 160 is a single-head attention mechanism, the calculating unit 14 may perform zero padding with zero padding layers inserted to the output sides of the Q layer and the K layer such that the following condition (II') is satisfied in place of the above conditions (I) to (III).

(II') The tensor 172*a* and the tensor 172*b* have the same number of elements.

Note that the tensor 172*a* from the Q layer is one example of the tensor QT, the tensor 172*b* from the K layer is an example of the tensor KT, and the tensor 172*c* from the V layer is an example of the tensor VT. In the following description, the tensors 172*a*, 172*b*, and 172*c* are sometimes simply referred to as "Q", "K", and "V", respectively.

Consequently, in the attention mechanism 160, the number of elements (i.e., sizes) can be made the same among the tensors the Q, the K, and the V. This allows the fully-connected layers 161 to 163 of the attention mechanism 160 to be pruned, so that the data compression ratio of machine learning model by pruning can be improved.

Figure 20:
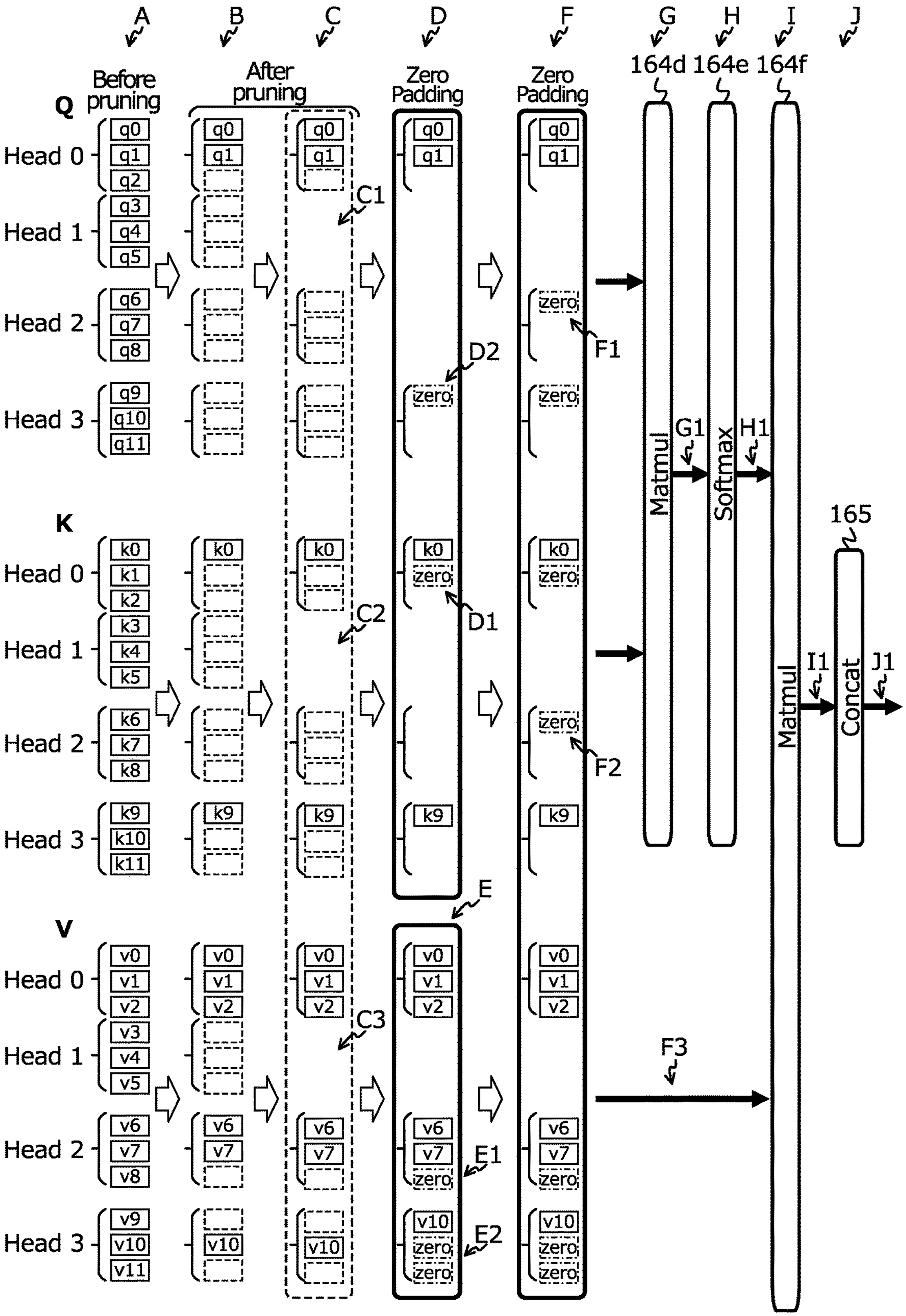
FIG. 20 is a diagram illustrating an example of zero-padding on a model.

FIG. 20 is a diagram illustrating an example of zero padding on the model 180. In the example of FIG. 20, for the sake of simplicity, the number of features of an input tensor is assumed to be 12, which means that the output of each of the Q layer, the K layer, and the V layer (e.g., splits 164*a* to 164*c*) is the number H of heads being four and the number of channels of each head being three.

The reference sign A in FIG. 20 indicates an example of the tensors 172*a* to 172*c* (Q, K, V) before pruning, which tensors are outputted from the Q layer, the K layer, and the V layer, respectively.

The reference sign B in FIG. 20 indicates an example of the tensors 172*a* to 172*c* after pruning (or in the middle of pruning), which tensors are outputted from the Q layer, the K layer, and the V layer, respectively.

The reference sign C in FIG. 20 indicates an example of pruning on heads by the calculating unit 14. For example, if all the elements in heads having the same head number among the tensors 172*a* to 172*c* of the Q layer, the K layer, and the V layer, respectively, the calculating unit 14 prunes the heads themselves. A head number is an example of head identifier information, and corresponds to the above-described subscript head. In the example of FIG. 20, the calculating unit 14 prunes the heads 1 as indicated by the reference signs C1 to C3.

In FIG. 20, reference signs D, E, and F denote an example of zero padding that the calculating unit 14 performs on the tensors 172*a* to 172*c* after the pruning indicated by the reference sign C.

As indicated by the reference sign D, the calculating unit 14 performs zero padding such that the number of elements of the tensor except for the tensor having a maximum number of elements among the number of elements of the Q and the number of elements of the K comes to be the maximum number of elements. For example, the calculating unit 14 inserts zero matrices to some heads such that the number of elements of a head of a certain head number included in the Q comes to be the same as the number of elements of the head having the same certain head number included in the K for each of the same head numbers in the Q and the K.

In the example of FIG. 20, the number of elements of the Q being two (q0, q1) is the maximum between the heads 0 of the Q and the K indicated by the reference sign D1, and the number of elements of the K being one (k9) is the maximum between the heads 3 of the Q and the K indicated by the reference sign D2. Therefore, the calculating unit 14 inserts a single zero (zero matrix) into the head 0 (k0) of the K having the number of elements being one to conform by a padding layer 182 to the number of elements being two of the head 0 of the Q, as illustrated in the reference sign D1. In addition, the calculating unit 14 inserts a single zero (zero matrix) into the head 3 of the Q having the number of elements being zero by a padding layer 181 to conform to the number of elements being one of the head 3 of the K, as illustrated in the reference sign D2.

This allows the heads of the Q and the K to have the same number of features (i.e., the numbers of features match), so that the above constraint 2 can be satisfied. That is, the zero padding indicated by the reference sign D is a process according to the above condition (II).

As indicated by the reference sign E, the calculating unit 14 performs zero padding on tensors of the respective heads of the V except for the tensor having a maximum number of elements among the heads of the V such that the number of elements of each of the tensor comes to be the maximum number. For example, the calculating unit 14 inserts zero matrices into some heads of the V such that the heads of the V come to have the same number of elements.

In the example of FIG. 20, as indicated by reference sign E1, the calculating unit 14 inserts one zero (zero matrix) into the head 2 (element number being two (v6, v7)) by a padding layer 183 to conform to the element number being three (v0, v1, v2) of the head 0. Furthermore, as indicated by reference sign E2, the calculating unit 14 inserts two zeros (zero matrix) into the head 3 (element number being one (v10)) by the padding layer 183 to conform to the element number being three (v0, v1, v2) of the head 0.

This allows the heads of the V to have the same number of features (i.e., the numbers of features match), so that the above constrain 3 can be satisfied. That is, the zero padding indicated by the reference sign E is a process according to the above condition (III).

As indicated by reference sign F, the calculating unit 14 inserts zero matrices to heads such that the Q, the K, and the V have the same number of heads. For example, if one or more heads having the same head number among the Q, the K, and the V have no element, the calculating unit 14 inserts zero matrices into the one or more heads.

In the example of FIG. 20, the head 2 of the V has elements (v6, v7, zero) while the head 2 of the Q and the head 2 of the K each have no element as indicated by reference sign F1 and F2. For the above, the calculating unit 14 inserts one zero (zero matrix) into the head 2 of the Q as indicated by reference sign F1, and inserts one zero (zero matrix) into the head 2 of the K as indicated by reference sign F2.

This allows the Q, the K, and the V to have the same number of heads (i.e., the numbers of head match), so that the above constraint 1 can be satisfied. That is, the zero padding indicated by the reference sign F is a process according to the above condition (I).

The reference sign G in FIG. 20 represents an arithmetic operation for a matrix product by the Matmul 164*d* using the Q and the K. The Matmul 164*d* can calculate a matrix product because all the elements of the existing head of the Q and the K to be inputted each have a counterpart element for calculating the "product" by the zero padding indicated by the reference sign D. In the matrix product operation, even if values of zero (or values close to zero) are inserted into tensors of the Q and the K by the zero padding under a case where the indices (e.g., head numbers) of the Q and the K match, the sum of the results (element products) of calculating the inner products is not affected (or is small if any).

For example, the Matmul 164*d* outputs the following result G1 as the result of an arithmetic operation for the matrix product.

$$A_0 = Q_0 \cdot K_0^T = q0 \cdot k0 + q1 \cdot 0$$

$$A_2 = Q_2 \cdot K_2^T = 0 \cdot 0$$

$$A_3 = Q_3 \cdot K_3^T = 0 \cdot k9$$

The reference sign H in FIG. 20 represents an arithmetic operation of the normalization process performed by the Softmax 164*e* using the result G1. For example, the Softmax 164*e* outputs the following result H1 as the result of the arithmetic operation of the normalization process. The result H1 is an example of the Att 173 illustrated in FIG. 19.

$$An_0=\text{Softmax}(A_0)$$

$$An_2=\text{Softmax}(A_2)$$

$$An_3=\text{Softmax}(A_3)$$

The reference sign I in FIG. 20 represents an arithmetic operation for a matrix product performed by the Matmul 164*f* using the result G1 and the V. The Matmul 164*d* can calculate a matrix product because all the elements of the existing head of the Q, the K, and the V to be inputted each have a counterpart element for calculating the "product" by the zero padding indicated by the reference sign F.

The V (refer to the reference sign F3) to be inputted to the Matmul 164*f* is as follows.

$$V_0=[v_0,v_1,v_2]$$

$$V_2=[v_6,v_7,0]$$

$$V_3=[v_{10},0,0]$$

For example, Matmul 164*f* outputs the following result I1 of an operation for a matrix product of the result G1 and the V (reference sign F3). The resulting I1 is an example of the tensor 174 illustrated in FIG. 19.

$$C_0=An_0\cdot V_0=[An_0\cdot v_0,An_0\cdot v_1,An_0\cdot v_2]$$

$$C_2=An_2\cdot V_2=[An_2\cdot v_6,An_2\cdot v_7,An_2\cdot 0]$$

$$C_3=An_3\cdot v_3=[An_3\cdot v_{10},An_3\cdot 0,An_3\cdot 0]$$

As described above, the attention mechanism 160 outputs a matrix product (reference sign I1) based on the matrix product (reference sign G1) obtained by normalizing the matrix product of the Q and the K both having undergone padding and the V having undergone padding (reference sign F3).

The reference sign J in FIG. 20 represents a concat arithmetic operation performed by the concat unit 165 using the result I1. The concat unit 165 can concatenate multiple vectors because the number of elements of the heads of the V to be inputted come to be the same by the zero padding as indicated by the reference sign E and consequently the number of features of the multiple vectors (result I1) to be concatenated come to be the same.

For example, the concat unit 165 outputs the following result J1 as the result of the concat arithmetic operation on the result I1. The result J1 is an example of the tensor 175 illustrated in FIG. 19.

$$\begin{aligned}C &= [C_0, C_1, C_2]\\ &= [An_0\cdot V_0, An_0\cdot V_1, An_0\cdot V_2,\\ &= An_2\cdot V_6, An_2\cdot v_7, 0,\\ &= An_3\cdot V_{10}, 0, 0]\end{aligned}$$

As described above, the zero padding process allows each of the Q, the K and the V to have a same number of elements (size) among the tensors. Therefore, the Q layer, the K layer, and the V layer can also be pruned using the provisionally calculated pruning rate candidates, so that the data compression ratio of the machine learning model including the attention mechanism 160 can be improved.

Note that the process described by referring to FIGS. 18 to 20 may be part of the processing of (i) by the threshold calculating unit 14*a*, or may be executed by the threshold calculating unit 14*a*.

The process of the calculating unit 14 after the processes described with reference to FIGS. 18 to 20 is the same as the process in (ii) and (iii).

The zero padding process described above is not limited to implementation when the element is a channel, and may alternatively be implemented when the element is either one or the both of a weight and a node.

FIG. 21 is a diagram illustrating an example of accuracy before and after pruning of a NN and a compression ratio of a data size with or without a zero padding process. FIG. 21 assumes that the model is a Bidirectional Encoder Representations from Transformers (BERT) base having subjected to training of QQP (Quora Question Pairs: binary classification task).

In FIG. 21, "Not inserting Zero padding layer" represents a case where the fully-connected layers 161 to 163 of the attention mechanism 160 (MHA structure) are excluded from the pruning target without applying the zero padding process. "Inserting Zero padding layer" represents a case where the fully-connected layers 161 to 163 of the attention mechanism 160 (MHA structure) are pruned by applying the zero padding process.

As illustrated in FIG. 21, when the zero padding process is applied, the data compression ratio of the downsized model 11*e* can be improved, suppressing lowering of the accuracy as compared with a case where the zero padding process is not applied.

<1-5> Operation Example

Figure 22:
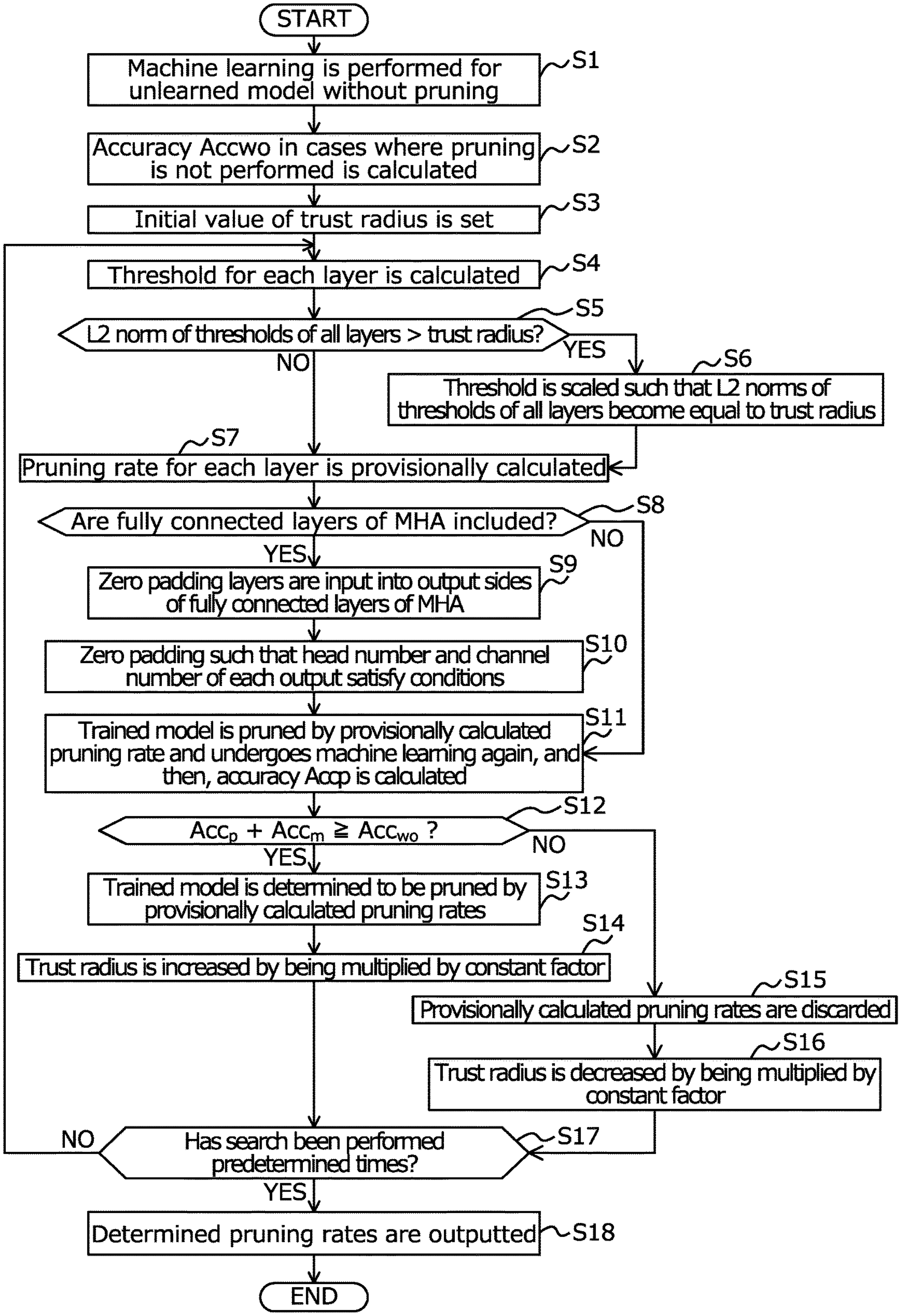
FIG. 22 is a flowchart for explaining an operation example of processes by the server according to the one embodiment.

Next, with reference to FIG. 22, an operation example of the server 1 according to the one embodiment will be described. FIG. 22 is a flowchart for explaining an operation example of processes by the server 1 according to the one embodiment.

As illustrated in FIG. 22, the machine learning unit 13 executes the machine learning on the untrained model 11*a* obtained by the obtaining unit 12 without pruning (Step S1).

The calculating unit 14 calculates the inference accuracy (recognition rate) $Acc_{wo}$ in cases where the pruning is not performed (Step S2).

The threshold calculating unit 14*a* sets the initial value of the trust radius (Step S3).

The threshold calculating unit 14*a* calculates the threshold T for each layer and the pruning error for each layer to be for setting the pruning rates (Step S4), and determines whether or not the L2 norm of the thresholds T of all layers are larger than the trust radius (Step S5). If the L2 norm of the thresholds T of all layers are equal to or smaller than the trust radius (NO in Step S5), the process proceeds to Step S7.

If the L2 norm of the thresholds T of all layers are larger than the trust radius (YES in Step S5), the threshold calculating unit 14*a* scales (updates) the thresholds such that the L2 norm of the thresholds T of all layers become equal to the trust radius (Step S6), and the process proceeds to Step S7.

In Step S7, the threshold calculating unit 14*a* provisionally calculates the pruning rate for each layer. For example, the threshold calculating unit 14*a* provisionally sets the pruning rate for each layer among the set pruning rate candidates.

The calculating unit 14 determines whether or not the fully-connected layers 161-163 of the attention mechanism 160 are included in the layers for which the pruning rates are provisionally calculated (Step S8). If the fully-connected layer 161 to 163 are not included in the layer for which the pruning rate is provisionally calculated (NO in Step S8), the process proceeds to step S11.

When fully-connected layer 161 to 163 of the attention mechanism 160 are included in the layer for which the pruning rate is provisionally calculated (YES in Step S8), the calculating unit 14 inserts the zero padding layers 181 to 183 into the respective outputs of the fully-connected layers 161 to 163, respectively (Step S9) and executes the process of Step S10, and then the process proceeds to Step S11.

In Step S10, the calculating unit 14 performs zero padding on the zero padding layers 181 to 183 such that the above-described conditions (I) to (III) relate to the number of heads and the number of elements (the number of channels) of the respective outputs (Q, K, V) of the fully-connected layers 161 to 163 are satisfied. Steps S4~S10 is an example of the process of the above (i).

The machine learning unit 13 prunes the trained model 11*c* by the pruning rates provisionally calculated by the threshold calculating unit 14*a*, and executes machine learning again on the model after the pruning. The calculating unit 14 calculates the inference accuracy $Acc_p$ of the model after the re-executed machine learning (Step S11).

The determining unit 14*b* determines whether or not the inference accuracy $Acc_p$+margin $Acc_m$ is equal to or higher than the inference accuracy $Acc_{wo}$ (Step S12). The evaluation of the inference accuracy (recognition rate) can compensate the mistakes in selecting the pruning rates due to the approximation error.

If the inference accuracy $Acc_p$+the margin $Acc_m$ is equal to or higher than the inference accuracy $Acc_{wo}$ (YES in Step S12), the determining unit 14*b* determines to prune the trained model 11*c* at the provisionally calculated pruning rates (Step S13), and stores, as the pruning rates 11*d*, the provisionally calculated pruning rates into the memory unit 11. Further, the threshold calculating unit 14*a* increases the trust radius by multiplying the trust radius by a constant factor (Step S14), and the process proceeds to Step S17.

On the other hand, if the inference accuracy $Acc_p$+margin $Acc_m$ is lower than the inference accuracy $Acc_{wo}$ (NO in Step S12), the determining unit 14*b* discards the provisionally calculated pruning rates (Step S15). The threshold calculating unit 14*a* decreases the trust radius by multiplying the trust radius by a constant factor (Step S16), and the process proceeds to Step S17. Steps S11 to S16 are examples of the process of (ii) described above.

In Step S17, the determining unit 14*b* determines whether or not the search (processes of Steps S4 to S16) has been performed predetermined times, in other words, whether or not the predetermined condition is satisfied regarding the execution times of the processes including the threshold calculation, the pruning rate candidate selection, and the pruning rate determination. If the search has not been performed the predetermined times (NO in Step S17), the process moves to Step S4.

If the search has been performed the predetermined times (YES in Step S17), the outputting unit 15 outputs the determined pruning rates 11*d* (Step S18), and the process ends. Step S17 is an example of the process of (iii) described above.

As described above, by the threshold calculating unit 14*a*, the server 1 according to the one embodiment calculates the errors in the tensors used for the NN, which errors are generated by the pruning, and generates the thresholds from the values of the loss functions and the gradients obtained by the backpropagation of the NN. Further, the threshold calculating unit 14*a* compares the calculated errors in the pruning with the thresholds to provisionally calculate the pruning rates. Furthermore, the determining unit 14*b* compares the inference accuracy of the model after re-learning at the calculated pruning rates with the inference accuracy of the unpruned model, and determines the pruning rate for each layer. At this time, if the inference accuracy of the case with the pruning is determined to be deteriorated as compared to the inference accuracy of the case without the pruning, the threshold calculate unit 14*a* resets the upper limit of the threshold such that the thresholds is decreased, and searches for the pruning rates again.

Thus, the server 1 according to the one embodiment can determine the pruning rate for each layer regardless of the type of the layers. For example, the server 1 can determine the pruning rates to be applied to the trained model 11*c* that includes a convolutional layer to which no BN layer is connected, a fully connected layer, and the like for each individual layer.

Further, according to the server 1, even when the attention mechanism 160 is included in the NN, the fully-connected layers 161 to 163 of the attention mechanism 160 can be appropriately pruned, and the data compression ratio of the downsized model 11*e* can be improved.

<1-6> Modifications

Next, modifications according to the one embodiment will be described. The following description assumes, for simplicity, that the margin $Acc_m$ of the inference accuracy is "0", in other words, in comparing the inference accuracy, it is determined whether or not the inference accuracy $Acc_p$ is equal to or higher than the inference accuracy $Acc_{wo}$. In the following description, the NN is assumed not to include the attention mechanism 160, but the process described with reference to FIGS. 16-21 can be applied likewise to either the following first and second modifications.

<1-6-1> First Modification

In the method according to the one embodiment, the number of times of searches for the pruning rates (the number of attempts of the process (iii)) is a hyperparameter manually set by, for example, a designer. As a result, for example, if the number of times of searches is set to be small, the trained model 11*c* may be insufficiently downsized, and if the number of times of searches is set to be large, the trained model 11*c* may be sufficiently downsized, but search durations may become longer.

Figure 23:
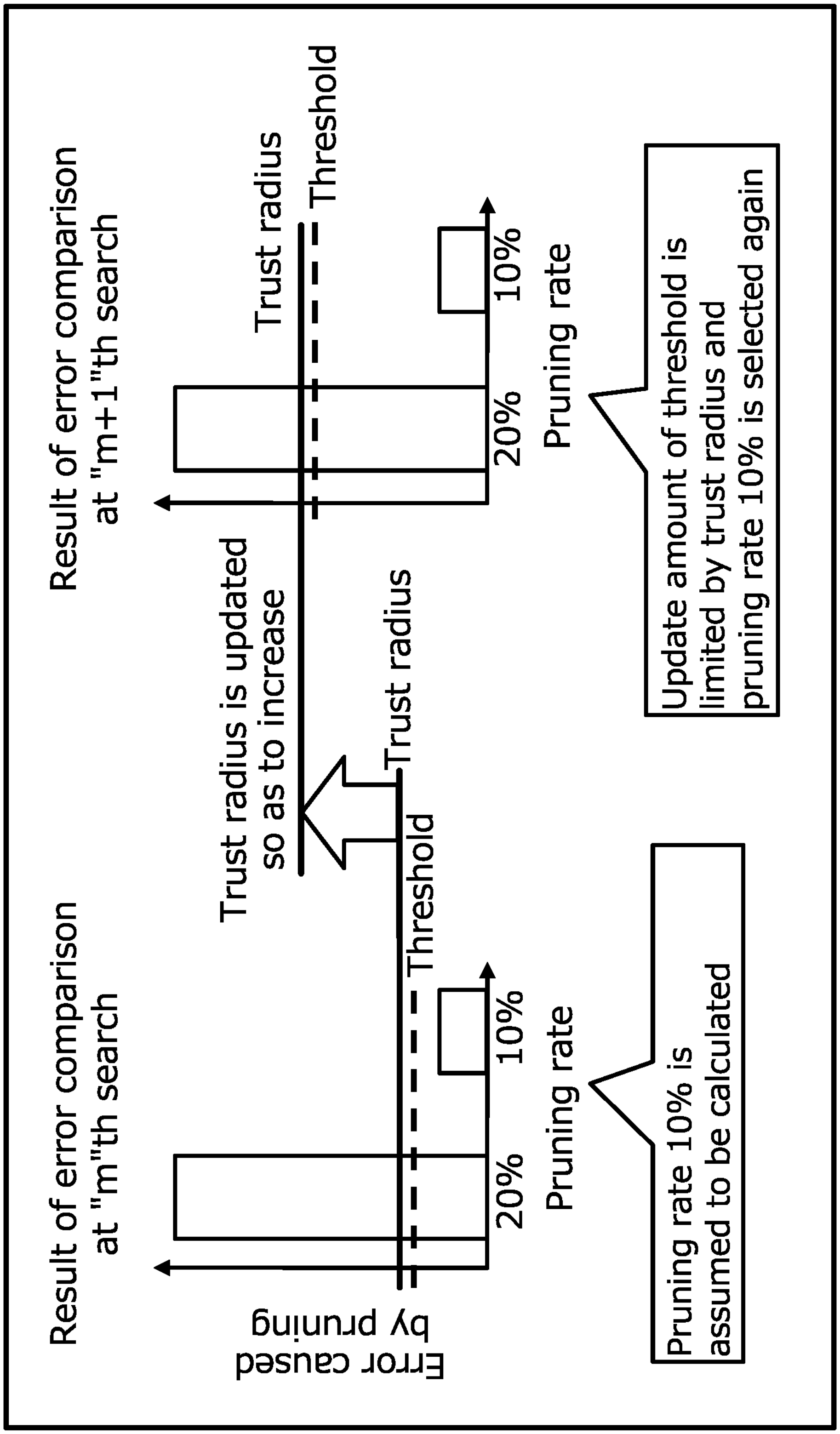
FIG. 23 is a diagram illustrating an example of a result of pruning error comparison in response to updating of a trust radius in the method according to the one embodiment.

FIG. 23 is a diagram illustrating an example of a result of the pruning error comparison in response to the update on the trust radius in the method according to the one embodiment.

As illustrated in FIG. 23, in the result of the error comparison at the "m"th (m is an integer equal to or greater than "1") search, the pruning rate of "10%" is assumed to be calculated (determined). In this case, the trust radius is updated so as to be increased by being multiplied by the constant K. However, if the trust radius after the update is smaller than the error according to the pruning rate candidate one size larger than the pruning rate candidate determined at the "m"th time, even in the result of the error comparison at the "m+1"th search, the pruning rate of "10%" is to be calculated again.

As such, when the trust radius is multiplied by the constant K or the constant k, the update amount of the threshold is limited by the trust radius, so that the same pruning rate candidates may be adopted in multiple searches. Such a state where combinations of the same pruning rates are searched for multiple times leads to an increase in the times of searches for the pruning rates while the pruning of the model is suppressed from being sufficiently attempted.

In view of this, a first modification describes, by focusing on the update on the trust radius, a method for shortening (decreasing) the search durations (the times of searches) for the pruning rates appropriate to downsize the NN.

Figure 24:
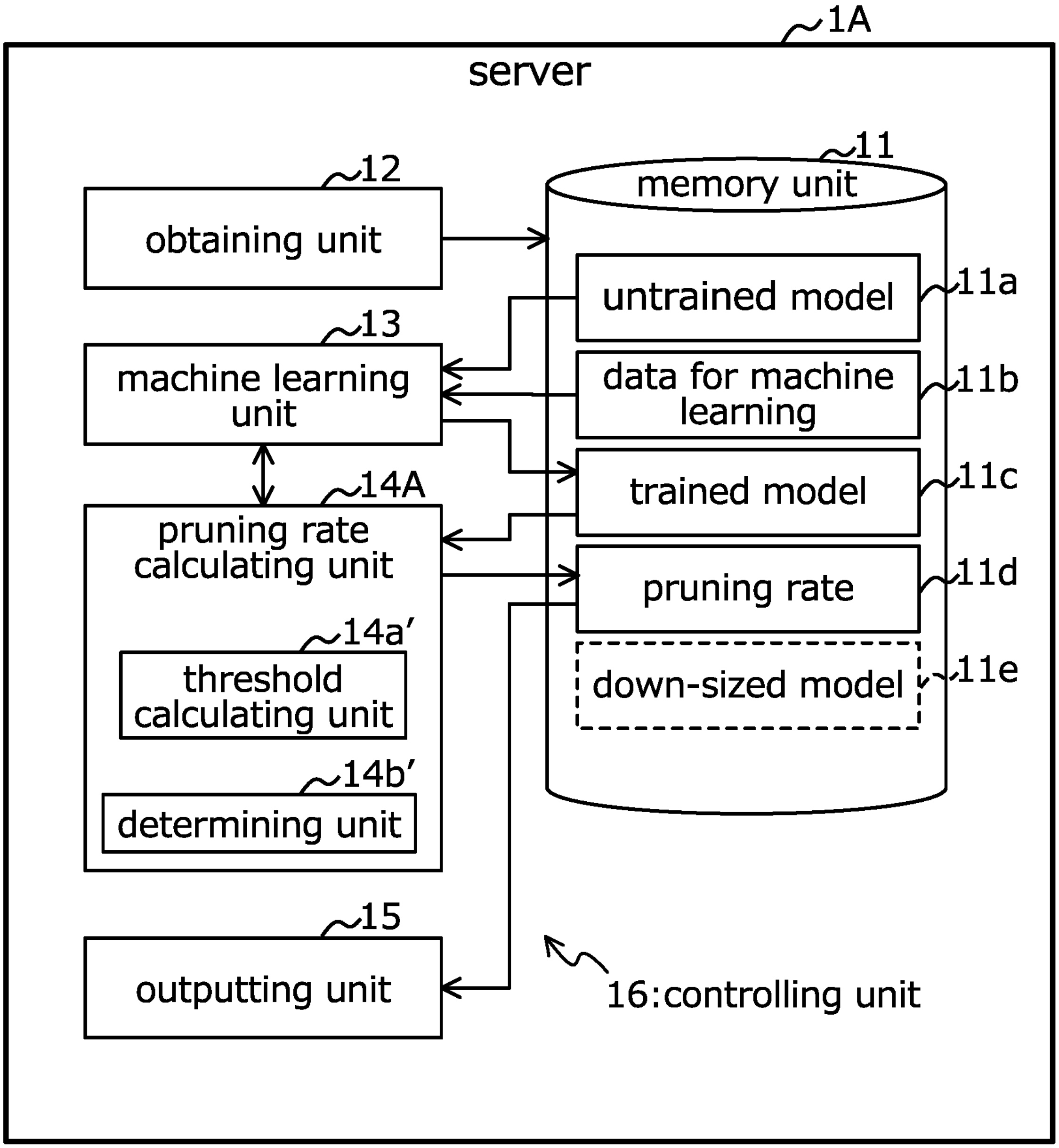
FIG. 24 is a block diagram illustrating an example of a functional configuration of a server according to a first modification.

FIG. 24 is a block diagram illustrating an example of a functional configuration of a server 1A according to the first modification. As illustrated in FIG. 24, the server 1A may include a calculating unit 14A that differs from the server 1 of FIG. 4. The calculating unit 14A may include a threshold calculating unit 14*a*' and a determining unit 14*b*' which differ from the calculating unit 14 of FIG. 4.

The calculating unit 14A searches for combinations of different pruning rates in each search. The state where the selected combination has the pruning rate of "0%" for all of the layers represents that the calculating unit 14A is assumed to determine not to search the pruning rates any more. Under such a premise, the calculating unit 14A (determining unit 14*b*') terminates the searching when the combination in which the pruning rate is "0%" for all of the layers is selected.

In accordance with the comparison result of the inference accuracy by the determining unit 14*b*', the threshold calculating unit 14*a*' measures, for each layer i (i is an integer equal to or greater than 1), an absolute value "$E_{diff,i}$" of a different amount between the threshold and the error in the pruning rate one size larger than the searched pruning rate or the error in the searched pruning rate.

For example, when the inference accuracy $Acc_p$ is equal to or higher than the inference accuracy $Acc_{wo}$, the threshold calculating unit 14*a*' measures the absolute value "$E_{diff,i}$" of the different amount between the threshold and the error in the pruning rate one size larger than the searched pruning rate.

On the other hand, when the inference accuracy $Acc_p$ is lower than the inference accuracy $Acc_{wo}$, the threshold calculating unit 14*a*' measures the absolute value "$E_{diff,i}$" of the different amount between the threshold and the error in the searched pruning rate.

As illustrated by the following equation (7), the threshold calculating unit 14*a*' acquires the smallest value (different amount) "$E_{diff}$" from the calculated absolute values "$E_{diff,i}$" of the different amounts of all layers.

$$E_{diff}=\min(E_{diff,1},E_{diff,2}, \ldots ,E_{diff,i}) \quad (7)$$

In accordance with the comparison result of the inference accuracy by the determining unit 14*b*', the threshold calculating unit 14*a*' updates the trust radius by adopting either one with a larger variation from the trust radius multiplied by a constant factor and the sum of or a difference between the trust radius and the different amount "$E_{diff}$".

For example, when the inference accuracy $Acc_p$ is equal to or higher than the inference accuracy $Acc_{wo}$, the threshold calculating unit 14*a*' adopts one with the larger variation from the trust radius multiplied by the constant K and the sum of the trust radius and the different amount "$E_{diff}$", and consequently, updates the trust radius to increase the trust radius.

On the other hand, when the inference accuracy $Acc_p$ is lower than the inference accuracy $Acc_{wo}$, the threshold calculating unit 14*a*' adopts one with the larger variation from the trust radius multiplied by the constant k and the difference between the trust radius and the different amount "$E_{diff}$", and consequently, updates the trust radius to decrease the trust radius.

In this manner, the threshold calculating unit 14*a*' updates the trust radius such that the combinations of the pruning rate candidates of the multiple layers differ in each execution of selecting (in other words, searching) the pruning rate candidates.

Figure 25:
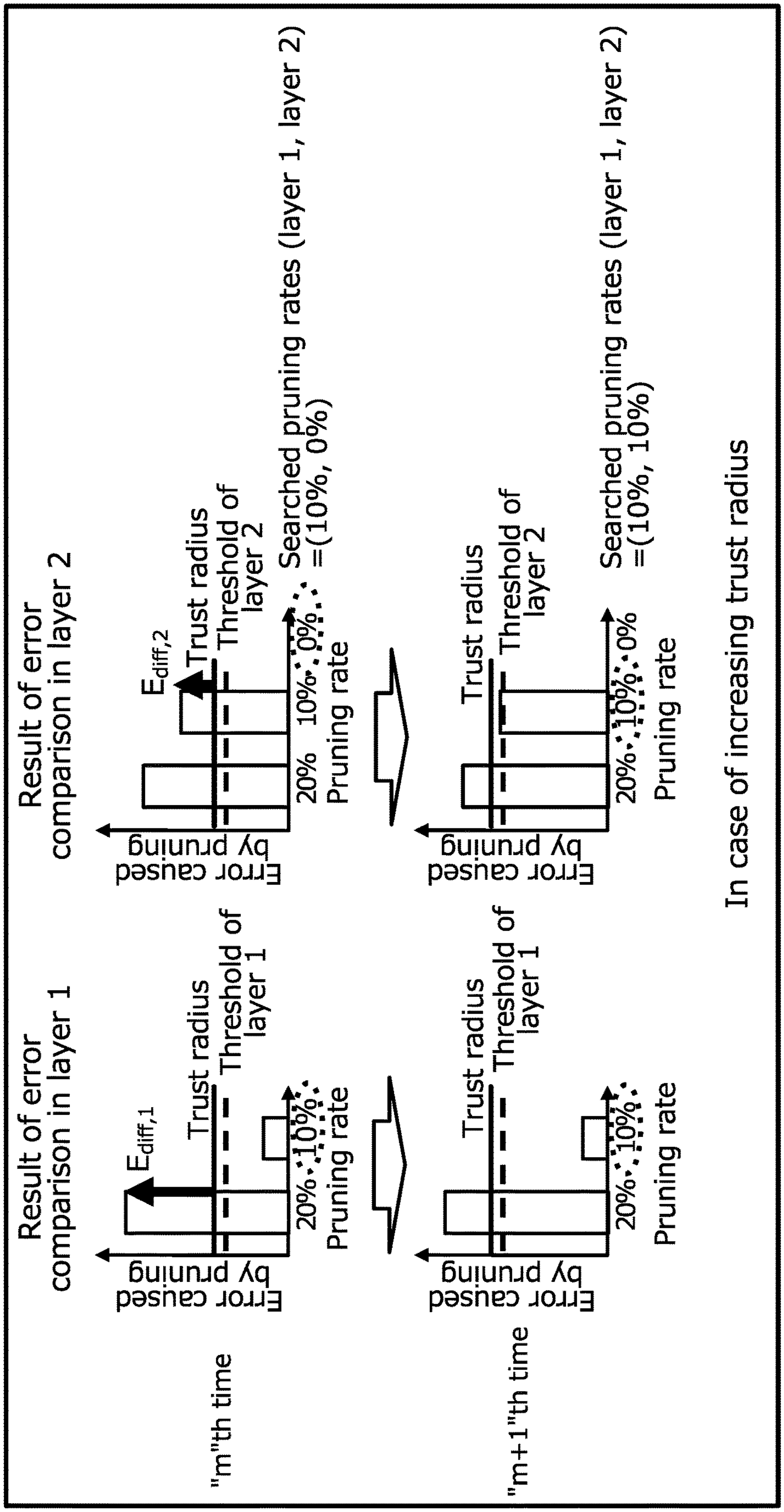
FIG. 25 is a diagram explaining an example of a trust radius update process in a case of increasing the trust radius.

FIG. 25 is a diagram explaining an example of a trust radius update process in case of increasing the trust radius. As illustrated in FIG. 25, it is assumed that the pruning rates searched at "m"th time are "(layer 1, layer 2)=(10%, 0%)". The threshold calculating unit 14*a*' calculates the absolute value "$E_{diff,1}$" of the different amount between the trust radius and the error in the pruning rate "20%" for the layer 1, and the absolute value "$E_{diff,2}$" of the different amount between the trust radius and the error in the pruning rate "10%" for the layer 2. In accordance with the above equation (7), the threshold calculating unit 14*a*' acquires, as the "$E_{diff}$", the different amount "$E_{diff,2}$" having a smaller value.

Then, the threshold calculating unit 14*a*' determines (updates) the trust radius at the "m+1"th (next) time according to the following equation (8).

$$\text{(Trust radius at “}m\text{+1”}th\text{ time)}=\max(\text{(Trust radius at “}m\text{”}th\text{ time}\cdot\text{Constant }K),\text{(Trust radius at “}m\text{”}th\text{ time}+E_{diff})) \quad (8)$$

As a result, at least a value equal to or greater than the "sum of the trust radius and the different amount" is selected as the trust radius at the "m+1"th time, so that in the "m+1"th time, a bit width different from the "m"th time is calculated as the pruning rate.

In the example of FIG. 25, the trust radius (upper limit of the threshold) at the "m+1"th search coincides with the error in the pruning rate "10%" for the layer 2. Therefore, at the "m+1"th search, the pruning rates "(layer 1, layer 2)=(10%, 10%)", which compose the combination of the pruning rates different from the previous time, are searched.

Figure 26:
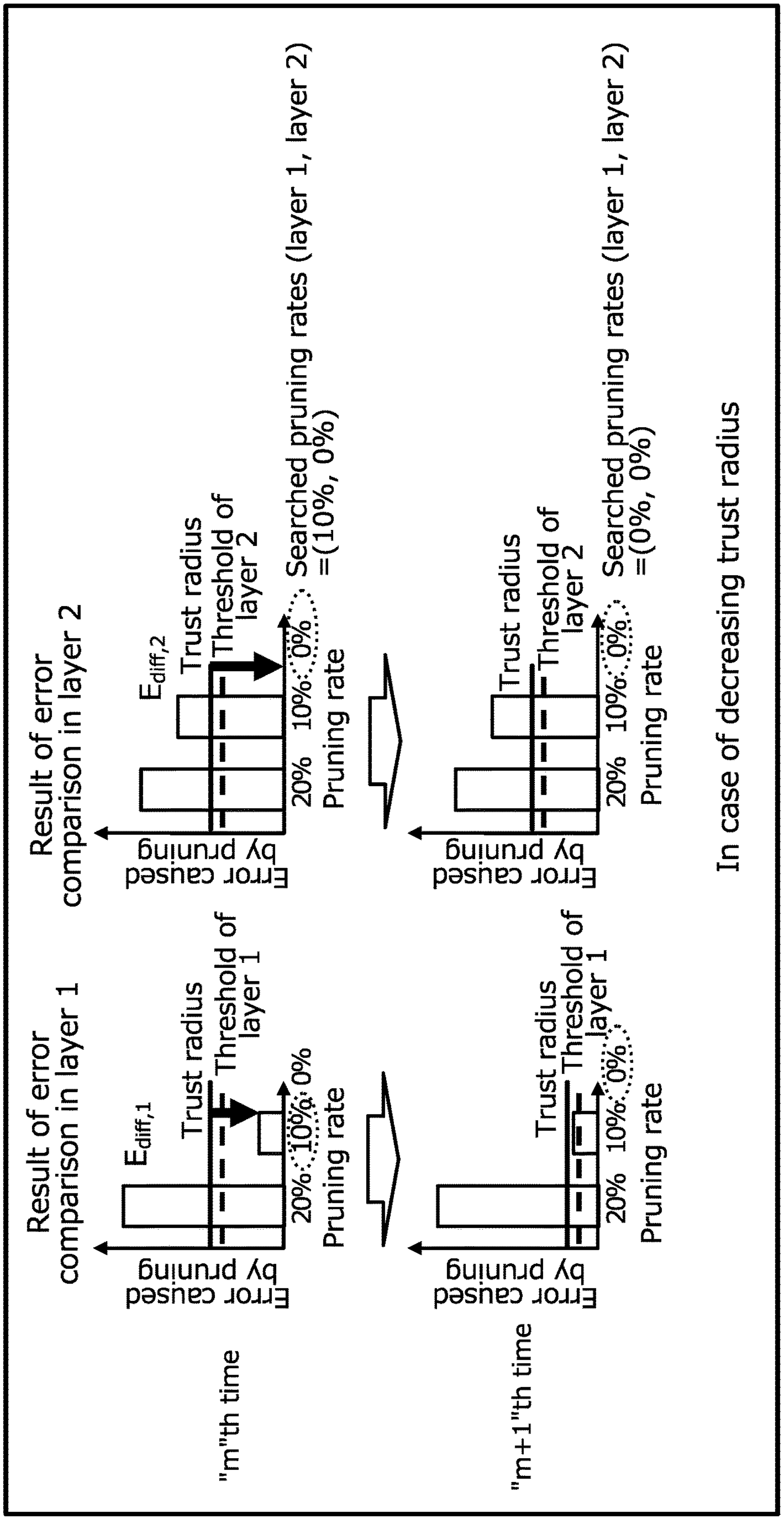
FIG. 26 is a diagram explaining an example of the trust radius update process in a case of decreasing the trust radius.

FIG. 26 is a diagram explaining an example of the trust radius update process in a case of decreasing the trust radius. As illustrated in FIG. 26, the pruning rates searched at the "m"th time are assumed to be "(layer 1, layer 2)=(10%, 0%)". The threshold calculating unit 14*a*' calculates the absolute value "$E_{diff,i}$" of the different amount between the trust radius and the error in the pruning rate "10%" for the layer 1, and the absolute value "$E_{diff,2}$" of the different amount between the trust radius and the error in the pruning rate "0%" for the layer 2. In accordance with the above equation (7), the threshold calculating unit 14*a*' acquires, as the "$E_{diff}$", the different amount "$E_{diff,i}$" having a smaller value.

Then, the threshold calculating unit 14*a*' determines (updates) the trust radius at the "m+1"th (next) time according to the following equation (9).

$$\text{(Trust radius at “}m\text{+1”}th\text{ time)}=\max(\text{(Trust radius at “}m\text{”}th\text{ time}\cdot\text{Constant factor)},\text{(Trust radius at “}m\text{”}th\text{ time}-E_{diff})) \quad (9)$$

As a result, at least a value equal to or greater than the "difference between the trust radius and the different amount" is selected as the trust radius at the "m+1"th time, so that in the "m+1"th time, a bit width different from the "m"th time is calculated as the pruning rate.

In the example of FIG. 26, the trust radius (upper limit of the threshold) at the "m+1"th search coincides with the error in the pruning rate "0%" for the layer 1. Therefore, at the "m+1"th search, the pruning rates "(layer 1, layer 2)=(0%, 0%), which compose the combination of the pruning rates different from the previous time, are searched.

When the above equations (8) and (9) are generalized, the trust radius at the next time can be expressed by the following equation (10).

$$\text{Trust radius at next time} = \text{Current trust radius} * \max(\text{Constant factor}, Q\text{scale\_min}) \quad (10)$$

In the above equation (10), the constant factor is K or k, "Qscale_min" is "Qscale" represented by the following equation (11), and "Qscale" is represented by the following equation (12).

$$Q\text{scale\_min} = \min(Q\text{scale calculated in all quantization target vectors}) \quad (11)$$

$$Q\text{scale} = 1 + Q\text{diff}/Qth \quad (12)$$

In the above equation (12), "Qdiff" is the "different amount between the threshold and the quantization error in a bit width one size narrower than the provisionally calculated bit width (pruning ratio)", and "Qth" is the threshold.

Figure 27:
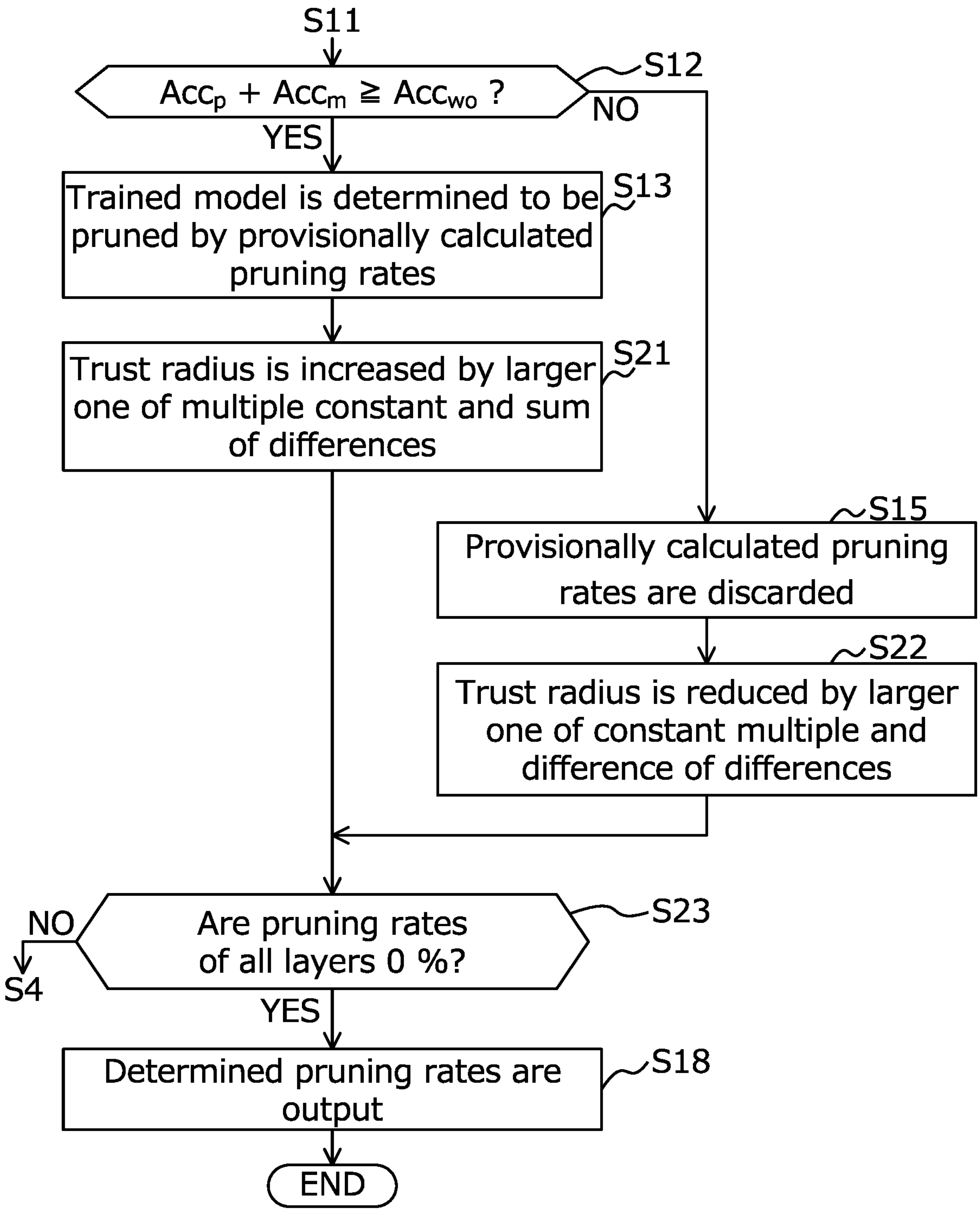
FIG. 27 is a flowchart for explaining an operation example of processes by the server according to the first modification.

Next, referring to FIG. 27, an operation example of the server 1A according to the first modification will be described. FIG. 27 is a flowchart for explaining an operation example of the processes by the server 1A according to the first modification. FIG. 27 corresponds to the flowchart in which Steps S14, S16 and S17 of the flowchart according to the server 1 illustrated in FIG. 22 are replaced with Steps S21, S22, and S23, respectively. Also in the first modification, the threshold calculating unit 14*a*' sets the initial value of the trust radius in Step S3.

In Step S21, the threshold calculating unit 14*a*' increases the trust radius by using larger one of the multiplication of the constant K and the "sum of the different amount", and the process proceeds to Step S23.

In Step S22, the threshold calculating unit 14*a*' decreases the trust radius by using larger one of the multiplication of the constant k and the "difference from the different amount", and the process proceeds to Step S23.

In Step S23, the determining unit 14*b*' determines whether or not the pruning rates 11*d* of all layers are "0%", in other words, whether or not the pruning rates satisfy the predetermined condition. If the pruning rate 11*d* of at least one layer is not "0%" (NO in Step S23), the process moves to Step S4.

If the pruning rates 11*d* of all layers are "0%" (YES in Step S23), the outputting unit 15 outputs the determined pruning rates 11*d* (Step S18), and the process ends.

As described above, the first modification differs from the one embodiment in the method for updating the trust radius by the threshold calculating unit 14*a*' and the end condition for determining the end of searching by the determining unit 14*b*'. Thus, the server 1A can search for the pruning rates appropriate for sufficiently downsizing the NN in shortest durations (least number of times). In addition, it is possible to omit the setting (designation) of the times of searches by the designer or the like.

<1-6-2> Second Modification

In the methods according to the one embodiment and the first modification, the initial value of the trust radius is a hyperparameter set by a designer or the like.

Even when the times of searches are the same, the model size may differ between the cases where the initial value of the trust radius is set to be large and where the initial value of the trust radius is set to be small. In addition, when the initial value of the trust radius is set to be large, the times of searches required for the model size to be sufficiently diminished may increase as compared with the case where the initial value of the trust radius is set to be small.

As such, depending on the initial value of the trust radius, the final model size and the times of searches for the pruning rates may vary, in other words, the performance of the servers 1 and 1A may varies.

Therefore, a second modification describes a method for suppressing variation in the performance of the servers 1 and 1A.

Figure 28:
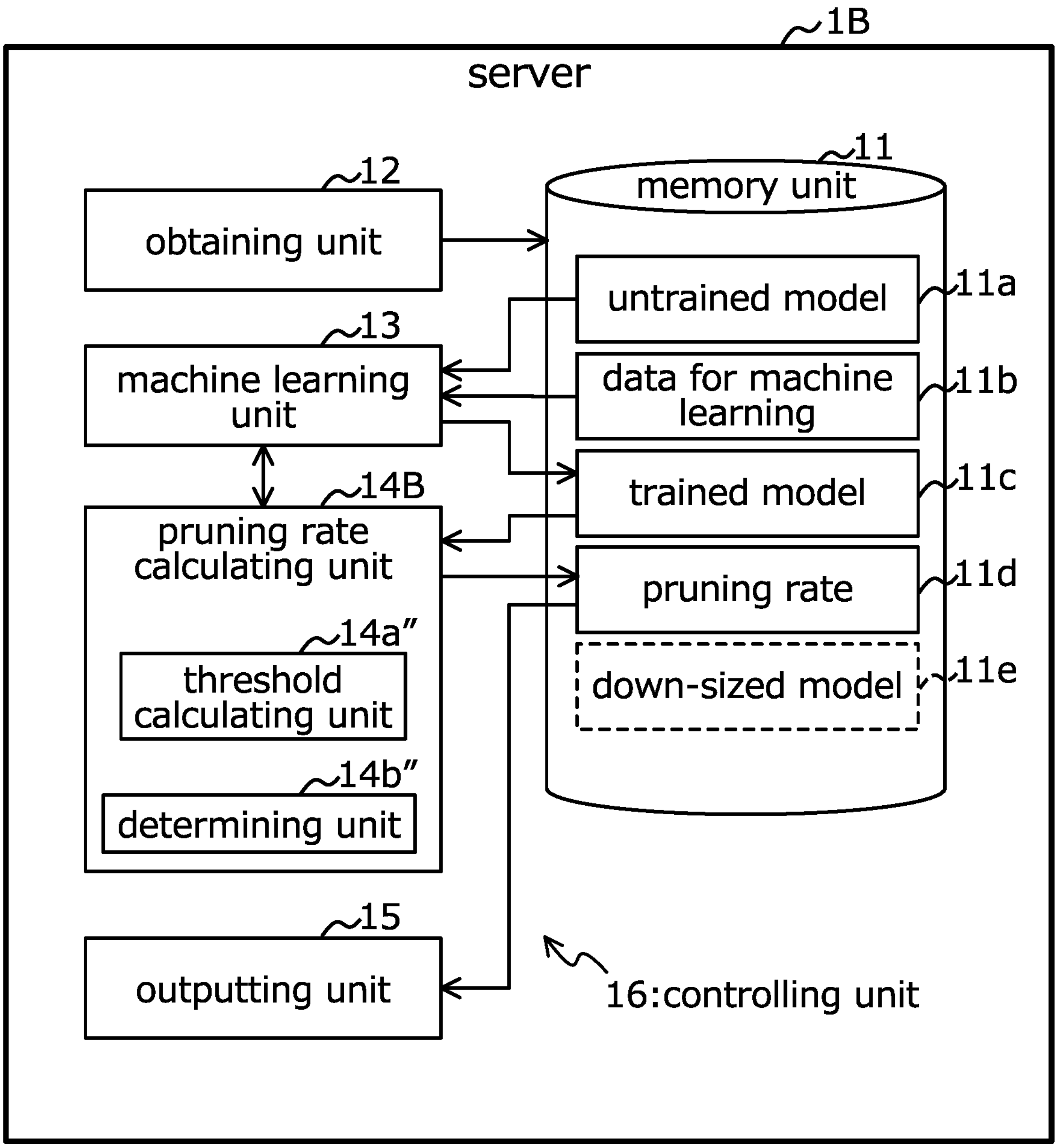
FIG. 28 is a block diagram illustrating an example of a functional configuration of a server according to a second modification.

FIG. 28 is a block diagram illustrating an example of a functional configuration of a server 1B according to the second modification. As illustrated in FIG. 28, the server 1B may include a calculating unit 14B different from the server 1 of FIG. 4. The calculating unit 14B may include a threshold calculating unit 14*a*" and a determining unit 14*b*", which differ from the calculating unit 14 of FIG. 4.

In pruning a model, it is known that gradually pruning the model by using low pruning rates can maintain accuracy and compress the model at a high compression rate as compared with pruning the model at once by using high pruning rates.

As illustrated in the above equation (5), since the threshold T is set according to the reciprocal of the gradient, layers with large thresholds T represent layers with small gradients. The layers with small gradients have small effect on the accuracy even when pruned.

Therefore, the server 1B (threshold calculating unit 14*a*") sets, for example, the initial value of the trust radius to be a value such that the pruning rate in the first search becomes the minimum. For this, the threshold calculating unit 14*a*" may, for example, set the initial value of the trust radius to be a value that causes, among all layers, the layer where the threshold T is the maximum to be pruned and the remaining layer(s) to be unpruned (such that the pruning rates become "0%").

By setting the initial value of the trust radius as described above, the server 1B can further compress the model size or maintain the accuracy as compared to the case where the initial value of the trust radius is manually set, for example, to be large.

Figure 29:
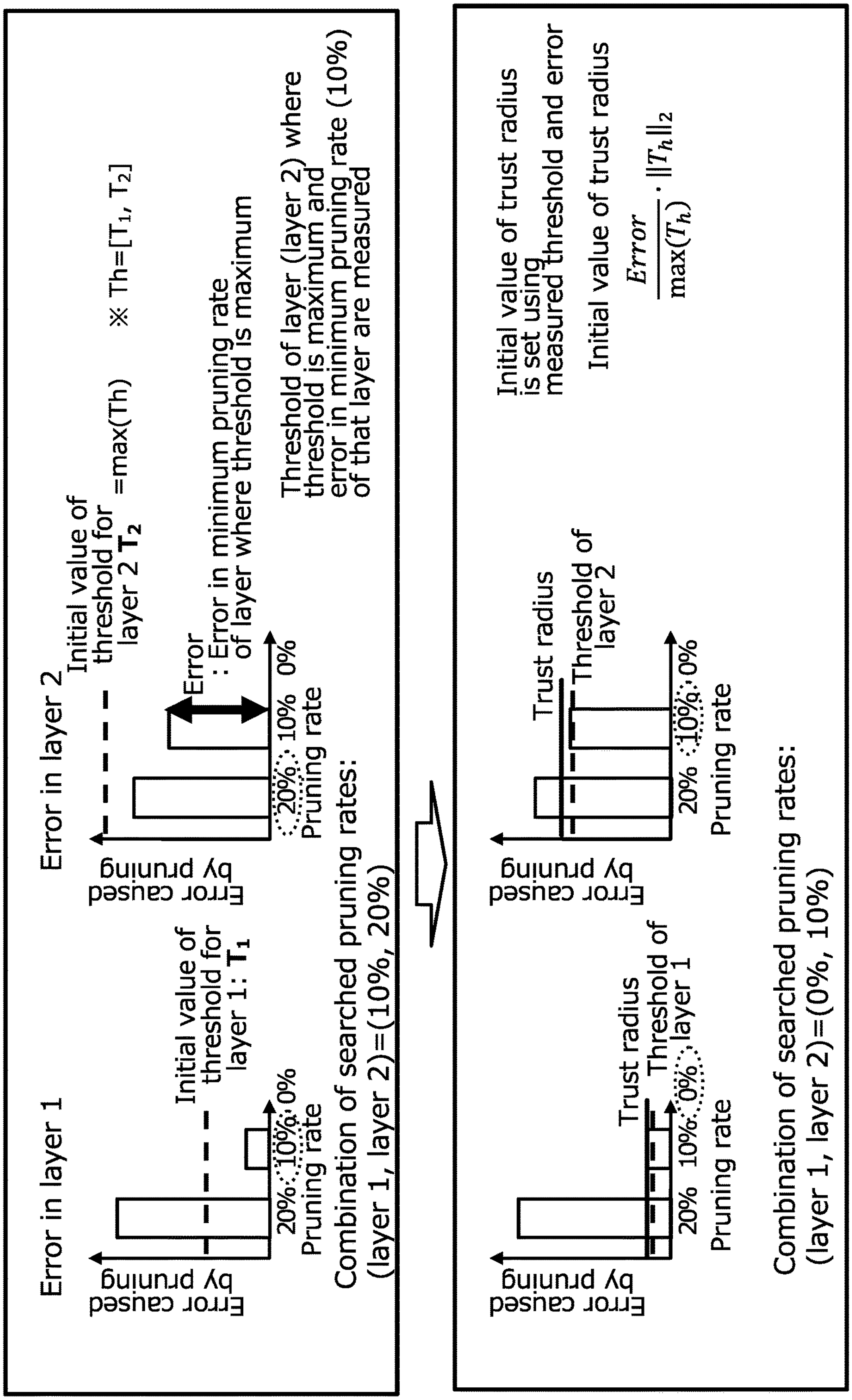
FIG. 29 is a diagram explaining an example of a setting of the initial value of the trust radius.

FIG. 29 is a diagram explaining an example of a setting of the initial value of the trust radius. As illustrated in the upper part of FIG. 29, when the initial value of the trust radius is not set, the combination of the pruning rates to be searched is "(layer 1, layer 2)=(10%, 20%)".

As illustrated in FIG. 29, in the first search for the pruning rates, the threshold calculate unit 14*a*" measures, among all layers, the threshold (max(Th)) of the layer where the threshold is the maximum and the error (Error) caused by the minimum (except for "0%") pruning rate in the layer.

Th represents a vector according to the threshold $T_1$, $T_2$, . . . for each layer, and in the example of FIG. 29, Th=[$T_1$, $T_2$]. The threshold (max(Th)) is the threshold for the layer where the threshold is the maximum, and is $T_2$ in the example of FIG. 29. The error (Error) is the error in the minimum pruning rate for the layer where the threshold is the maximum, and in the example of FIG. 29, the error in the pruning rate "10%" for the layer 2 is measured.

Next, using the measured threshold and the error, the threshold calculating unit 14*a*" sets the initial value of the trust radius according to the following equation (13). In the following equation (13), "$\|Th\|_2$" is the L2 norm of the thresholds of all layers.

[Equation 7]

$$\text{Initial } valule \text{ of trust radius} = \frac{\text{Error}}{\max(T_h)} \cdot \|T_h\|_2 \quad (13)$$

The threshold calculating unit 14*a*" sets the thresholds $T_1$, $T_2$ such that the minimum pruning rate "10%" is selected as the pruning rate of the layer having the maximum threshold (layer 2) and the pruning rate "0%" is selected in the remaining layer (layer 1) by the initial value of the calculated trust radius.

Thus, as illustrated in the lower part of FIG. 29, when the initial value of the trust radius is set and the thresholds $T_1$, $T_2$ are set, the combination of the pruning rates to be searched becomes "(layer 1, layer 2)=(0%, 10%)". Since the layer (layer 2) of the pruning target is the layer where the threshold is the maximum, in other words, the gradient is the minimum, the effect on the accuracy by the pruning can be suppressed small.

The function of the threshold calculating unit 14*a*" other than the process of setting the initial value of the trust radius may be similar to the function of at least one of the threshold calculating unit 14*a* according to the one embodiment and the threshold calculating unit 14*a*' according to the first modification. The determining unit 14*b*" may be similar to at least one of the determining unit 14*b* according to the one embodiment and the determining unit 14*b*' according to the first modification.

That is, the method according to the second modification may be realized by a combination of one of or both the one embodiment and the first modification.

Figure 30:
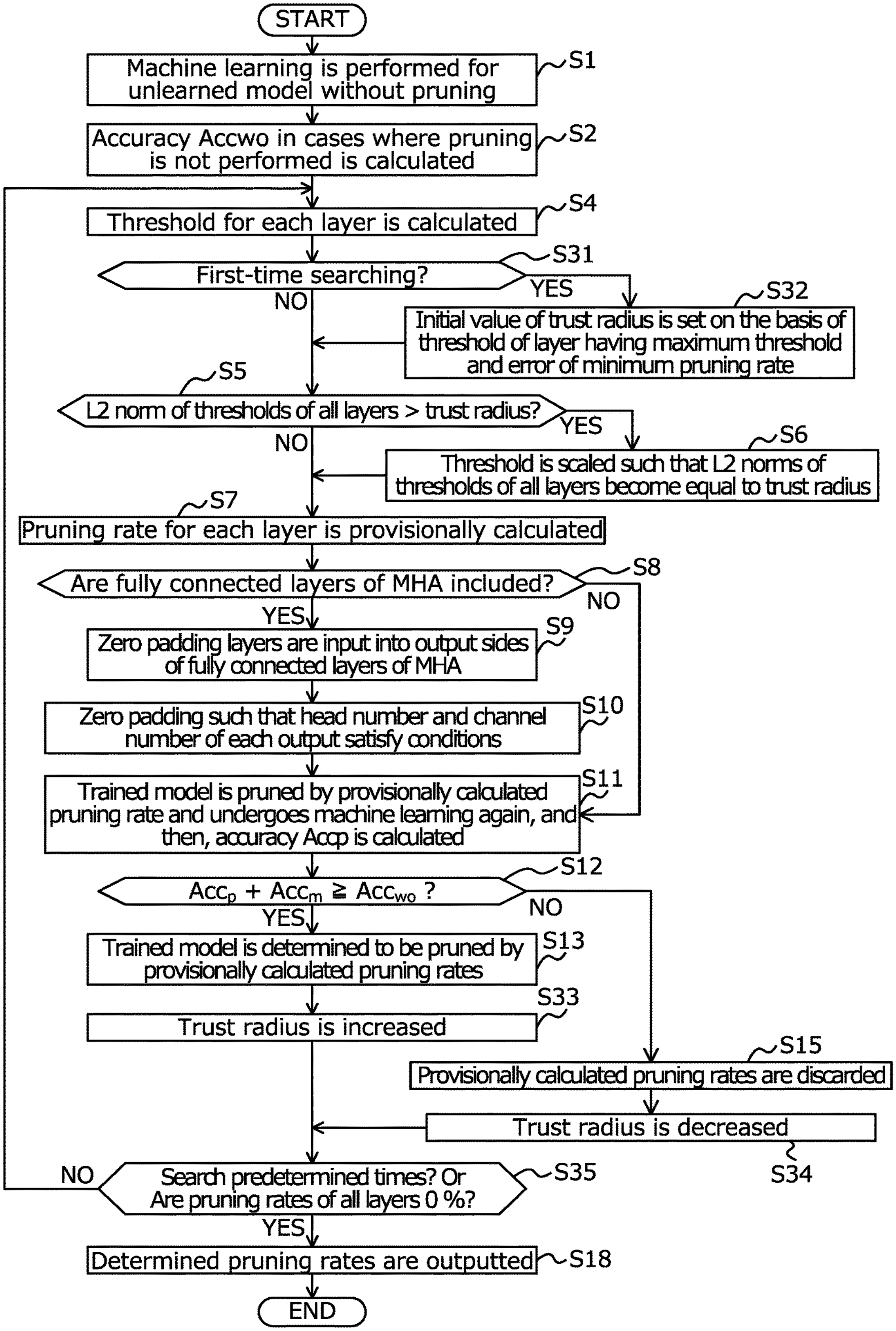
FIG. 30 is a flowchart for explaining an operation example of processes by the server according to the second modification.

Next, referring to FIG. 30, an operation example of the server 1B according to the second modification will be described. FIG. 30 is a flowchart for explaining an operation example of the processes by the server 1B according to the second modification. FIG. 30 corresponds to the flowchart in which, of the flowchart according to the server 1 illustrated in FIG. 22, Step S3 is deleted, Steps S31 and S32 are added between Steps S4 and S5, and Steps S14, S16, and S17 are replaced with Steps S33, S34, and S35, respectively.

In Step S31, after calculating the threshold for each layer in Step S4, the threshold calculating unit 14*a*" determines whether or not the search is the first time. When the search is not the first time (NO in Step S31), the process proceeds to Step S5.

When the search is the first time (YES in Step S31), the threshold calculating unit 14*a*" sets the initial value of the trust radius based on the threshold and the minimum pruning rate error in the layer where the threshold is the maximum (Step S32), and the process proceeds to Step S5.

Steps S33, S34, and S35 may be either Steps S14, S16, and S17 illustrated in FIG. 22 or Steps S21, S22, and S23 illustrated in FIG. 27, respectively.

As described above, the second modification uses the method for setting the initial value of the trust radius by the threshold calculating unit 14*a*" that differs from the methods of the first embodiment and the first modification. Thus, the server 1B can suppress variation in the final model size and the times of searches for the pruning rates, and can suppress variation in the performance of the servers 1 and 1A.

Furthermore, the server 1B can suppress manual setting of the initial value (hyperparameter) of the trust radius by a designer or the like, and can dynamically set the initial value of the trust radius according to the layers of the trained models 11*c*. Therefore, appropriate pruning rates can be set for each model, and regardless of the model, the variation in the final model size and the times of searches for the pruning rates can be suppressed, so that variation in the performance of the servers 1 and 1A can be suppressed.

<1-7> Example of Hardware Configuration

The servers 1, 1A, and 1B according to the one embodiment and the first and second modifications may each be a virtual machine (VM; Virtual Machine) or a physical machine. The functions of the servers 1, 1A, and 1B may be realized by one computer or by two or more computers. At least some of the functions of the servers 1, 1A, and 1B may be implemented using HW (Hardware) resources and NW (Network) resources provided by cloud environments.

Figure 31:
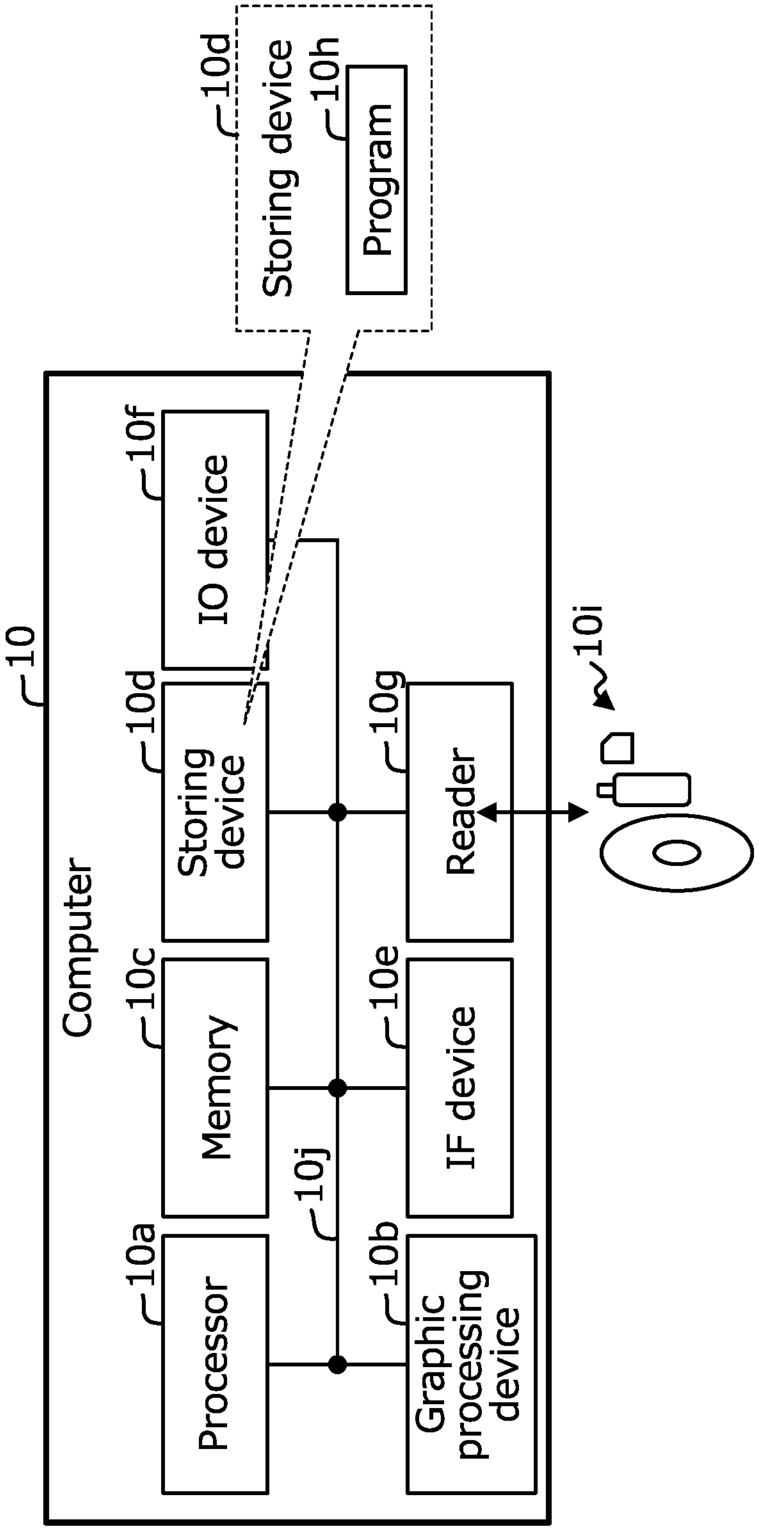
FIG. 31 is a block diagram illustrating an example of a hardware (HW) configuration of a computer.

FIG. 31 is a block diagram illustrating an example of a hardware configuration of a computer 10. Hereinafter, the computer 10 is exemplified as the hardware (HW) that realizes each function of the servers 1, 1A, and 1B. When multiple computers are used as the HW resources for realizing each function of the servers 1, 1A, and 1B, each computer may include the HW configuration illustrated in FIG. 31.

As illustrated in FIG. 31, the computer 10 may illustratively include, as the HW configuration, a processor 10*a*, a graphic processing device 10*b*, a memory 10*c*, a storing device 10*d*, an IF device (Interface) device 10*e*, an IO (Input/Output) device 10*f*, and a reader 10*g*.

The processor 10*a* is an example of an arithmetic processing device that performs various controls and calculations. The processor 10*a* may be connected to each block in the computer 10 via a bus 10*j* so as to be mutually communicable. The processor 10*a* may be a multi-processor including multiple processors or a multi-core processor having multiple processor cores, or may be configured to have multiple multi-core processors.

The processor 10*a* may be, for example, an integrated circuit (IC; Integrated Circuit) such as CPUs (Central Processing Units), MPUs (Micro Processing Units), APUs (Accelerated Processing Units), DSPs (Digital Signal Processors), ASICs (Application Specific ICs), or FPGAs (Field-Programmable Gate Arrays), and a combination of two or more of the above ICs.

The graphic processing device 10*b* executes a screen displaying control on an outputting device such as a monitor included in IO device 10*f*. The graphic processing device 10*b* may have a configuration as an accelerator that executes a machine learning process and an inference process using a machine learning model. Example of the graphic processing device 10*b* are various type of arithmetic operation processing apparatus, and include ICs such as GPUs, APUs, DSPs, ASICs, and FPGAs.

For example, the processor 10*a* may execute a program 10*h* (machine learning program) that achieves the overall or part of the various functions of the computer 10. For example, the processor 10*a* may achieve the functions of the obtaining unit 12, the calculating unit 14, 14A, or 14B, and the outputting unit of the server 1, 1A, or 1B (see FIG. 4, 24, or 28) on the basis of the program 10*h*. The graphic processing device 10*b* may execute an arithmetic calculation, such as matrix arithmetic calculation, used in calculation of a NN, for example, and may achieve the function of the machine learning unit 13 of the server 1, 1A, or 1B (see FIG. 4, 24, or 28).

The memory 10*c* is an example of a HW device that stores information such as various types of data and programs. Examples of the memory 10*c* include one or both of a volatile memory such as a Dynamic Random Access Memory (DRAM) and a non-volatile memory such as a Persistent Memory (PM).

The storing device 10*d* is an example of a HW device that stores information such as various types of data and programs. Examples of the storing device 10*d* include a magnetic disk device such as a Hard Disk Drive (HDD), a semiconductor drive device such as a Solid State Drive (SSD), and various storing devices such as a non-volatile memory. Examples of the non-volatile memory include a flash memory, a Storage Class Memory (SCM), and a Read Only Memory (ROM).

The storing device 10*d* may store the program 10*h*. The processor 10*a* of the server 1, 1A, or 1B can achieve the function of the controlling unit 16 (see FIG. 4, 27, or 28) of the server 1, 1A, or 1B by expanding the program 10*h* stored in the storing unit 10*d* onto the memory 10*c* and executing the expanded program 10*h*.

The memory unit 11 illustrated in FIG. 4, 24, or 28 may be achieved by a storing region possessed by at least one of the memory 10*c* and the storing unit 10*d*.

The IF device 10*e* is an example of a communication IF that controls connection and communication between the computer 10 and a network. For example, the I/F device 10*e* may include an applying adapter conforming to Local Area Network (LAN) such as Ethernet (registered trademark) or optical communication such as Fibre Channel (FC). The applying adapter may be compatible with one of or both wireless and wired communication schemes. For example, the server 1, 1A, or 1B may be communicably connected, through the IF device 10*e*, to a non-illustrated computer. The functions of one of or the both the obtaining unit 12 and the outputting unit 15 illustrated in FIG. 4, 24, or 28 may be achieved by the IF device 19*e*. For example, the program 10*h* may be downloaded from the network to the computer 10 through the communication IF and be stored in the storing device 10*d*, for example.

The IO device 10*f* may include one of or both an input device and an output device. Examples of the input device include a keyboard, a mouse, and a touch panel. Examples of the output device include a monitor, a projector, and a printer. The IO device 10*f* may include, for example, a touch panel that integrates an input device and an output device. The output device may be connected to the graphic processing device 10*b*. For example, the outputting unit 15 illustrated in FIG. 4, 24, or 28 may output a pruning rate 11*d* to the output device of the IO device 10*f* and displays the pruning rate 11*d* on the output device.

The reader 10*g* is an example of a reader that reads data and programs recorded on a recording medium 10*i*. The reader 10*g* may include a connecting terminal or device to which the recording medium 10*i* can be connected or inserted. Examples of the reader 10*g* include an applying adapter conforming to, for example, Universal Serial Bus (USB), a drive apparatus that accesses a recording disk, and a card reader that accesses a flash memory such as an SD card. The program 10*h* may be stored in the recording medium 10*i*. The reader 10*g* may read the program 10*h* from the recording medium 10*i* and store the read program 10*h* into the storing device 10*d*.

The recording medium 10*i* is an example of a non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the computer 10 described above is exemplary. Accordingly, the computer 10 may appropriately undergo increase or decrease of HW devices (e.g., addition or deletion of arbitrary blocks), division, integration in an arbitrary combination, and addition or deletion of the bus. For example, the servers 1, 1A, and 1B may each omit at least one of the IO device 10*f* and the reader 10*g*.

<2> Miscellaneous

The above-described technique according to the embodiment and the first and second modifications can be modified and implemented as follows.

For example, the obtaining unit 12, the machine learning unit 13, the calculating unit 14, 14A or 14B, and the outputting unit 15 included in the server 1, 1A or 1B illustrated in FIG. 4, 24, or 28 may be merged or may each be divided.

For example, the server 1, 1A, or 1B illustrated in FIG. 4, 24 or 28 may be configured to realize each processing function by multiple devices cooperating with each other via networks. As an example, in the server 1, 1A, or 1B, the obtaining unit 12 and the outputting unit 15 may be a web server and an application server, the machine learning unit 13 and the calculating unit 14, 14A or 14B may be an application server, the memory unit 11 may be a database server, or the like. In this case, the web server, the application server, and the DB server may realize the processing function as the server 1, 1A, or 1B by cooperating with each other via networks.

Further, the method of applying the zero-padding process to a NN including an attention mechanism described with reference to FIGS. 16-21 is not limited to application to the pruning accomplished by the servers 1, 1A, and 1B respectively illustrated in FIGS. 4, 24, and 28. Alternatively, the method of applying the zero-padding process may be applied to various method for determining the pruning rates for each layer of a NN.

As one aspect, the present disclosure can realize downsizing of a neural network including an attention mechanism.

Throughout the descriptions, the indefinite article "a" or "an", or adjective "one" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a machine learning program for causing a computer to execute a process comprising:

inserting padding layers into a downstream side of each of a Q layer and a K layer, each of the padding layers padding one or more elements of a tensor, the Q layer outputting a Query, the K layer outputting a Key, the Query and the Key being a result of an arithmetic operating process on an input tensor in an attention mechanism in the trained machine learning model of a neural network having the attention mechanism, and padding a tensor QT included in a reduced Q layer in which one or more elements are reduced based on a first reduction ratio and a tensor KT included in a reduced K layer in which one or more elements are reduced based on a second reduction ratio with the padding layers associated one with each of the reduced Q layer and the reduced K layer such that the tensor QT has a number of elements same as a number of elements that the tensor KT has.

2. The non-transitory computer-readable recording medium according to claim 1, wherein the padding comprises padding the tensor QT and the tensor KT such that a number of elements of each of tensors except for a tensor having a maximum number of elements among the tensor QT and the tensor KT comes to be the maximum number of elements, and suppressing the padding of the tensor having the maximum number of elements.

3. The non-transitory computer-readable recording medium according to claim 1, wherein the process further comprises, when the attention mechanism has a multi-head attention mechanism and each of the Q layer, the K layer, and a V layer that outputs a Value as a result of the arithmetic operation on the input tensor in the attention mechanism outputs respective tensors of a plurality of heads, inserting a padding layer padding one or more elements of a tensor into a downstream side of the V layer in the trained machine-learning model; and the padding comprises padding the tensor QT, the tensor KT, and a tensor VT included in a reduced V layer in which one or more elements are reduced based on a third reduction ratio with the padding layers associated one with each of the reduced Q layer, the reduced K layer, and the reduced V layer such that the tensor QT, the tensor KT, and the tensor VT have a same number of heads, same heads of the tensor QT and the tensor KT have a same number of elements, and the number of elements of each of heads of the tensor VT is same.

4. The non-transitory computer-readable recording medium according to claim 3, wherein the padding comprises padding the tensor QT, the tensor KT, and the tensor VT such that a head included in the tensor QT and a head included in the tensor VT that have a same head number include a same number of elements for each of the head numbers.

5. The non-transitory computer-readable recording medium according to claim 3, wherein the attention mechanism outputs a matrix product based on the tensor VT after the padding and a matrix product obtained by normalizing a matrix product of the tensor QT after the padding and the tensor KT after the padding.

6. The non-transitory computer-readable recording medium according to claim 5, wherein the neural network comprises a concatenating unit that outputs a result of concatenating elements of the matrix product outputted from the attention mechanism.

7. The non-transitory computer-readable recording medium according to claim 1, wherein the padding layers are each a zero padding layer that inserts a zero matrix into a corresponding tensor to be input.

8. A computer-implemented method for machine learning comprising:

inserting padding layers into a downstream side of each of a Q layer and a K layer, each of the padding layers padding one or more elements of a tensor, the Q layer outputting a Query, the K layer outputting a Key, the Query and the Key being a result of an arithmetic operating process on an input tensor in an attention mechanism in the trained machine learning model of a neural network having the attention mechanism, and padding a tensor QT included in a reduced Q layer in which one or more elements are reduced based on a first reduction ratio and a tensor KT included in a reduced K layer in which one or more elements are reduced based on a second reduction ratio with the padding layers associated one with each of the reduced Q layer and the reduced K layer such that the tensor QT has a number of elements same as a number of elements that the tensor KT has.

9. The computer-implemented method according to claim 8, wherein the padding comprises padding the tensor QT and the tensor KT such that a number of elements of each of tensors except for a tensor having a maximum number of elements among the tensor QT and the tensor KT comes to be the maximum number of elements, and suppressing the padding of the tensor having the maximum number of elements.

10. The computer-implemented method according to claim 8, further comprising when the attention mechanism has a multi-head attention mechanism and each of the Q layer, the K layer, and a V layer that outputs a Value as a result of the arithmetic operation on the input tensor in the attention mechanism outputs respective tensors of a plurality of heads, inserting a padding layer padding one or more elements of a tensor into a downstream side of the V layer in the trained machine-learning model, wherein layer in which one or more elements are reduced based on a third reduction ratio with the padding layers associated one with each of the reduced Q layer, the reduced K layer, and the reduced V layer such that the tensor QT, the tensor KT, and the tensor VT have a same number of heads, same heads of the tensor QT and the tensor KT have a same number of elements, and the number of elements of each of heads of the tensor VT is same.

11. The computer-implemented method according to claim 10, wherein the padding comprises padding the tensor QT, the tensor KT, and the tensor VT such that a head included in the tensor QT and a head included in the tensor VT that have a same head number include a same number of elements for each of the head numbers.

12. The computer-implemented method according to claim 10, wherein the attention mechanism outputs a matrix product based on the tensor VT after the padding and a matrix product obtained by normalizing a matrix product of the tensor QT after the padding and the tensor KT after the padding.

13. The computer-implemented method according to claim 12, wherein the neural network comprises a concatenating unit that outputs a result of concatenating elements of the matrix product outputted from the attention mechanism.

14. The computer-implemented method according to claim 8, wherein the padding layers are each a zero padding layer that inserts a zero matrix into a corresponding tensor to be input.

15. An information processing apparatus comprising:

a memory; and a processor coupled to the memory, the processor being configured to execute a process comprising:

inserting padding layers into a downstream side of each of a Q layer and a K layer, each of the padding layers padding one or more elements of a tensor, the Q layer outputting a Query, the K layer outputting a Key, the Query and the Key being a result of an arithmetic operating process on an input tensor in an attention mechanism in the trained machine learning model of a neural network having the attention mechanism, and padding a tensor QT included in a reduced Q layer in which one or more elements are reduced based on a first reduction ratio and a tensor KT included in a reduced K layer in which one or more elements are reduced based on a second reduction ratio with the padding layers associated one with each of the reduced Q layer and the reduced K layer such that the tensor QT has a number of elements same as a number of elements that the tensor KT has.

16. The information processing apparatus according to claim 15, wherein the padding comprises padding the tensor QT and the tensor KT such that a number of elements of each of tensors except for a tensor having a maximum number of elements among the tensor QT and the tensor KT comes to be the maximum number of elements, and suppressing the padding of the tensor having the maximum number of elements.

17. The information processing apparatus according to claim 15, wherein the processor further comprises, when the attention mechanism has a multi-head attention mechanism and each of the Q layer, the K layer, and a V layer that outputs a Value as a result of the arithmetic operation on the input tensor in the attention mechanism outputs respective tensors of a plurality of heads, inserting a padding layer padding one or more elements of a tensor into a downstream side of the V layer in the trained machine-learning model, and the padding comprises padding the tensor QT, the tensor KT, and a tensor VT included in a reduced V layer in which one or more elements are reduced based on a third reduction ratio with the padding layers associated one with each of the reduced Q layer, the reduced K layer, and the reduced V layer such that the tensor QT, the tensor KT, and the tensor VT have a same number of heads, same heads of the tensor QT and the tensor KT have a same number of elements, and the number of elements of each of heads of the tensor VT is same.

18. The information processing apparatus according to claim 17, wherein the padding comprises padding the tensor QT, the tensor KT, and the tensor VT such that a head included in the tensor QT and a head included in the tensor VT that have a same head number include a same number of elements for each of the head numbers.

19. The information processing apparatus according to claim 17, wherein the attention mechanism outputs a matrix product based on the tensor VT after the padding and a matrix product obtained by normalizing a matrix product of the tensor QT after the padding and the tensor KT after the padding.

20. The information processing apparatus according to claim 19, wherein the neural network comprises a concatenating unit that outputs a result of concatenating elements of the matrix product outputted from the attention mechanism.

* * * * *